(12) United States Patent
Nakamura et al.

(10) Patent No.: US 10,139,470 B2
(45) Date of Patent: Nov. 27, 2018

(54) SOUND PROCESSING APPARATUS AND SOUND PROCESSING METHOD

(71) Applicant: HONDA MOTOR CO., LTD., Tokyo (JP)

(72) Inventors: Keisuke Nakamura, Wako (JP); Kazuhiro Nakadai, Wako (JP); Surya Ambrose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 838 days.

(21) Appl. No.: 14/604,038

(22) Filed: Jan. 23, 2015

(65) Prior Publication Data
US 2015/0226831 A1    Aug. 13, 2015

(30) Foreign Application Priority Data

Feb. 13, 2014    (JP) .................. 2014-025757

(51) Int. Cl.
*G01S 3/801* (2006.01)
*G01S 3/80* (2006.01)
*G01S 3/808* (2006.01)
*G01S 5/20* (2006.01)

(52) U.S. Cl.
CPC ............ *G01S 3/8006* (2013.01); *G01S 3/801* (2013.01); *G01S 3/808* (2013.01); *G01S 5/20* (2013.01)

(58) Field of Classification Search
CPC . G01S 3/80; G01S 3/8006; G01S 5/20; G01S 3/808; G01S 3/801
USPC ....................................... 367/118
See application file for complete search history.

(56) References Cited

U.S. PATENT DOCUMENTS

| 8,693,287 | B2 * | 4/2014 | Nakadai ................ G01S 3/8006 367/124 |
| 9,247,343 | B2 * | 1/2016 | Nakadai ................... H04R 1/32 |
| 9,639,084 | B2 * | 5/2017 | Nakamura ........... G05D 1/0274 |
| 9,743,211 | B2 * | 8/2017 | Harma .................... H04S 7/301 |

(Continued)

FOREIGN PATENT DOCUMENTS

| JP | 07-028492 A | 1/1995 |
| JP | 2003-333697 A | 11/2003 |

(Continued)

OTHER PUBLICATIONS

Japanese Office Action, with full English language translation, corresponding to Appln. No. 2014-025757, dated Oct. 10, 2017.

*Primary Examiner* — Isam A Alsomiri
*Assistant Examiner* — Amie M NDure
(74) *Attorney, Agent, or Firm* — Squire Patton Boggs (US) LLP

(57) ABSTRACT

A sound processing apparatus includes a sound collection position calculating unit configured to calculate sound collection positions of sound signals of multiple channels on the basis of the sound signals, a sound source direction calculating unit configured to calculate a sound source direction on the basis of the sound signals of multiple channels, a first transfer function calculating unit configured to calculate a first transfer function corresponding to the sound source direction on the basis of the sound signals of multiple channels, and a second transfer function calculating unit configured to calculate a second transfer function by interpolating the first transfer function corresponding to each of a plurality of sound source directions.

10 Claims, 19 Drawing Sheets

(56) References Cited

U.S. PATENT DOCUMENTS

| | | | | |
|---|---|---|---|---|
| 2010/0329479 A1* | 12/2010 | Nakadai | ............... | H04R 3/005 381/92 |
| 2012/0069714 A1* | 3/2012 | Nakadai | ............... | G01S 3/8006 367/125 |
| 2012/0195436 A1* | 8/2012 | Nakadai | ............... | H04R 3/005 381/56 |
| 2013/0151249 A1* | 6/2013 | Nakadai | ............... | G08B 5/00 704/231 |
| 2014/0072142 A1* | 3/2014 | Nakadai | ............... | H04R 1/32 381/92 |

FOREIGN PATENT DOCUMENTS

| | | |
|---|---|---|
| JP | 2004-064697 A | 2/2004 |
| JP | 2004-279845 A | 10/2004 |
| JP | 4482247 B2 | 6/2010 |
| JP | 2012-161071 A | 8/2012 |
| WO | 2008/126343 A1 | 10/2008 |

\* cited by examiner

FIG.7

| SOUND SOURCE DIRECTION | CHANNEL 1 | CHANNEL 2 | CHANNEL 3 | CHANNEL 4 | CHANNEL 5 | CHANNEL 6 | CHANNEL 7 |
|---|---|---|---|---|---|---|---|
| 13 | 0.24+0.35j | 0.44-0.08j | 0.40+0.29j | 0.18+0.51j | -0.37+0.32j | -0.14+0.48j | 0.15+0.29j |
| 29 | ..... | ..... | ..... | ..... | ..... | ..... | ..... |
| 35 | ..... | ..... | ..... | ..... | ..... | ..... | ..... |
| ... | ..... | ..... | ..... | ..... | ..... | ..... | ..... |

FIG.14

| SOUND SOURCE DIRECTION | RELIABILITY | CHANNEL 1 | CHANNEL 2 | CHANNEL 3 | CHANNEL 4 | CHANNEL 5 | CHANNEL 6 | CHANNEL 7 |
|---|---|---|---|---|---|---|---|---|
| 13 | 0.186 | 0.24+0.35j | 0.44-0.08j | 0.40-0.29j | 0.18+0.51j | -0.37+0.32j | -0.14+0.48j | 0.15+0.29j |
| 29 | 0.256 | | | | | | | |
| 35 | 0.284 | | | | | | | |
| ... | ... | | | | | | | |

SOUND PROCESSING APPARATUS AND SOUND PROCESSING METHOD

CROSS REFERENCE TO RELATED APPLICATIONS

Priority is claimed on Japanese Patent Application No. 2014-025757, filed on Feb. 13, 2014, the content of which is incorporated herein by reference.

BACKGROUND OF THE INVENTION

Field of the Invention

The present invention relates to a sound processing apparatus and a sound processing method.

Description of Related Art

A transfer function indicating transfer characteristics when sound generated from a sound source propagates to a sound collecting unit might be used to process a collected sound signal. The transfer function is used for the purpose of correction of sound quality (such as equalizing), reverberation reduction, noise reduction, estimation of a sound source direction or a sound source position, and the like.

Accordingly, various methods of calculating a transfer function have been proposed in the related art.

For example, a sound system described in Japanese Patent No. 4482247 sequentially outputs a plurality of predetermined band noise signals of different frequency bands from a speaker, filters detected noise signals detected by microphones disposed in a sound field of the speaker by the use of a plurality of predetermined band filters, and analyzes the filtered detected noise signals for each of a plurality of frequency bands. The sound system inputs the band noise signals and the detected noise signals to a transfer function calculating unit, calculates transfer functions from the speaker to the microphones, and corrects the calculated transfer functions depending on the passing characteristics of the band filters.

In the sound system described in Japanese Patent No. 4482247, the positional relationships between the microphones and the sound source is known and it is necessary to use a measuring sound source for the aforementioned detected noise signals separately from a hearing sound source. Accordingly, a method of estimating the positional relationships between the microphones and the sound sources using collected sound signals without using the measuring sound source has been proposed.

For example, a sound source position estimating method described in Japanese Unexamined Patent Application, First Publication No. 2012-161071 includes calculating an inter-channel time difference of sound signals, predicting current sound source state information from previous sound source state information which is sound source state information including a sound source position and a microphone position, and estimating the sound source state information so as to reduce an error between the calculated inter-channel time difference of the sound signals and a time difference based on the sound source state information.

SUMMARY OF THE INVENTION

Transfer functions can be estimated using a geometric model from the positional relationships between the microphones and the sound sources which have been estimated using the sound source position estimating method described in Japanese Unexamined Patent Application, First Publication No. 2012-161071, but the transfer functions cannot be estimated in room environments which are individually different. In an example of a room environment, reverberation in a room varies depending on the size of the room, the reflection coefficient of walls, the presence of objects installed therein or the type thereof, and the like. Since the transfer functions depend on the positional relationships between the microphones and the sound source, it is not possible to acquire transfer functions in desired sound source directions.

The present invention is made in consideration of the above-mentioned circumstances and an object thereof is to provide a sound processing apparatus and a sound processing method which can calculate transfer functions in desired sound source directions depending on a room environment without using a measuring sound source.

In order to solve the aforementioned problem and to achieve the aforementioned object, the present invention employs the following aspects.

(1) According to an aspect of the present invention, there is provided a sound processing apparatus including: a sound collection position calculating unit configured to calculate sound collection positions of sound signals of multiple channels on the basis of the sound signals; a sound source direction calculating unit configured to calculate a sound source direction on the basis of the sound signals of multiple channels; a first transfer function calculating unit configured to calculate a first transfer function corresponding to the sound source direction on the basis of the sound signals of multiple channels; and a second transfer function calculating unit configured to calculate a second transfer function by interpolating the first transfer function corresponding to each of a plurality of sound source directions.

(2) The sound processing apparatus according to (1) may further include a time difference calculating unit configured to calculate an inter-channel time difference of the sound signals, in which the sound collection position calculating unit includes a first state predicting unit configured to predict current sound source state information from previous sound source state information as sound source state information including the sound collection position, and a first state updating unit configured to update the current sound source state information so as to reduce a difference between the time difference calculated by the time difference calculating unit and a time difference based on the current sound source state information.

(3) In the sound processing apparatus according to (2), the time difference calculating unit may calculate the inter-channel time difference of the sound signals in which the sound collection positions are located within a predetermined range.

(4) In the sound processing apparatus according to (2) or (3), time difference information at a timing which is delayed by at least a predetermined delay time from the time difference information input to the sound collection position calculating unit may be input to the sound source direction calculating unit, and time difference information at a timing which is delayed by at least the predetermined delay time from the sound signal associated with the time difference information input to the sound collection position calculating unit may be input to the first transfer function calculating unit.

(5) In the sound processing apparatus according to any one of (2) to (4), the sound source direction calculating unit may include a second state predicting unit configured to predict current sound source state information from previous sound source state information as sound source state information including the sound source position, and a second state updating unit configured to update the current sound source state information so as to reduce a difference between the time difference calculated by the time difference calculating unit and a time difference based on the current sound source state information.

(6) In the sound processing apparatus according to (5), the second transfer function calculating unit may interpolate the first transfer function calculated by the first transfer function calculating unit by weighting based on an amount of sound source state information updated by the second state updating unit.

(7) The sound processing apparatus according to (5) or (6) may further include a second sound source direction calculating unit configured to calculate a sound source direction on the basis of the second transfer function calculated by the second transfer function calculating unit and the sound signals of multiple channels, and the second state updating unit may update the current sound source state information so as to reduce a difference between the sound source direction calculated by the second sound source direction calculating unit and a sound source direction based on the current sound source state information.

(8) In the sound processing apparatus according to any one of (1) to (4), the sound source direction calculating unit may include a third transfer function calculating unit configured to calculate a third transfer function indicating a phase variation due to propagation of sound to the sound collection position calculated by the sound collection position calculating unit for each sound source direction, and a first sound source direction determining unit configured to determine the sound source direction on the basis of the third transfer function calculated by the third transfer function calculating unit and the sound signals of multiple channels.

(9) According to another aspect of the present invention, there is provided a sound processing method in a sound processing apparatus, including: a step of calculating sound collection positions of sound signals of multiple channels on the basis of the sound signals; a step of calculating a sound source direction on the basis of the sound signals of multiple channels; a step of calculating a first transfer function corresponding to the sound source direction on the basis of the sound signals of multiple channels; and a step of calculating a second transfer function by interpolating the first transfer function corresponding to each of a plurality of sound source directions.

According to the configuration of (1) or (9), a set of sound source direction and first transfer function is obtained on the basis of the collected sound signals, and the second transfer function in a desired sound source direction is calculated with reference to the first transfer function in the obtained sound source direction. Accordingly, it is possible to calculate a transfer function in a desired direction depending on a room environment without using a measuring sound source.

According to the configuration of (2), since the sound collection position can be sequentially calculated on the basis of the collected sound signals, it is possible to obtain a sound collection position at that timing without using another measurement unit.

According to the configuration of (3), since the time difference between the neighboring sound collection positions is calculated, a variation in the calculated time difference is suppressed. Accordingly, since the sound collection position calculating unit can stably estimate the sound source state information on the basis of the calculated time difference, it is possible to calculate the sound collection position with high accuracy.

According to the configuration of (4), the process that is performed by the sound collection position calculating unit and the processes that are performed by the sound source direction calculating unit and the first transfer function calculating unit can be performed in parallel. Accordingly, since the delay until the estimation error of the sound source state information in the sound collection position calculating unit converges does not affect the sound source direction calculating unit and the first transfer function calculating unit, it is possible to more rapidly obtain the sound source direction and the first transfer function.

According to the configuration of (5), since the sound source direction can be sequentially calculated on the basis of the collected sound signals, it is possible to obtain a sound source direction at that timing without using another measurement unit.

According to the configuration of (6), the second transfer function is calculated by interpolating the first transfer function in the sound source direction through the use of weighting based on the amount of sound source state information updated which is used to calculate the sound source direction. Since the reliability of the sound source direction calculated by the sound source direction calculating unit depends on the amount of sound source state information updated, it is possible to improve the reliability of the calculated second transfer function.

According to the configuration of (7), since the sound source state information is updated on the basis of the sound source direction which is information different from the time difference, it is possible to decrease the possibility of a localized solution in comparison with a case in which only one of the time difference and the sound source direction is used. Accordingly, it is possible to calculate the sound collection position on the basis of the sound source state information more accurately.

According to the configuration of (8), the third transfer function can be calculated through a simple process and the sound source direction can be determined on the basis of the phase variation in each sound source direction at each sound collection position indicated by the calculated third transfer function. Accordingly, it is possible to reduce the amount of data processed without decreasing the estimation accuracy of the sound source direction.

BRIEF DESCRIPTION OF THE DRAWINGS

FIG. 7 is a diagram illustrating an example of first transfer function data according to the first embodiment of the present invention.

FIG. 14 is a diagram illustrating an example of first transfer function data according to the third embodiment of the present invention.

DETAILED DESCRIPTION OF THE INVENTION

First Embodiment

Hereinafter, a first embodiment of the present invention will be described with reference to the accompanying drawings.

Figure 1:
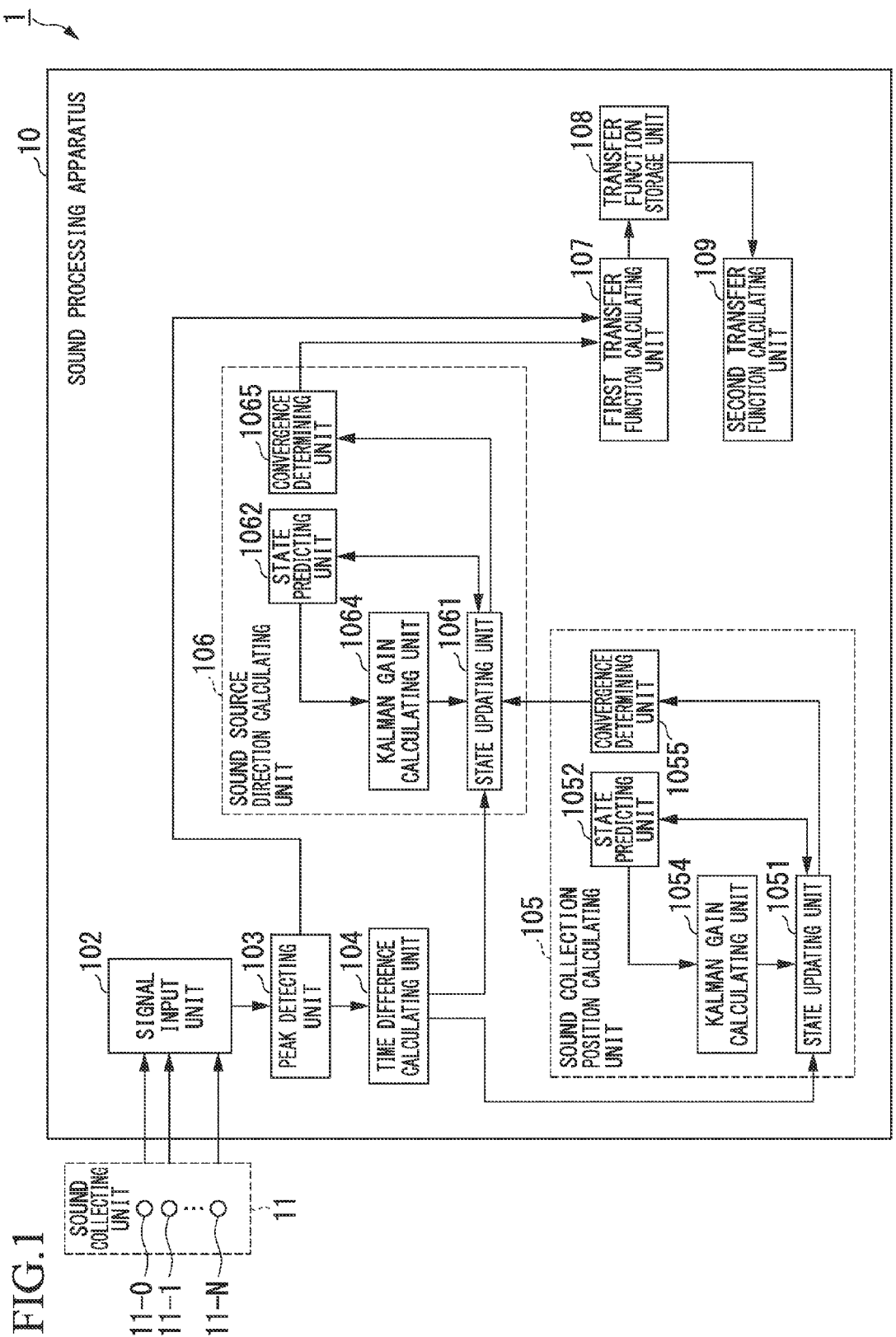
FIG. 1 is a block diagram schematically illustrating a configuration of a sound processing system according to a first embodiment of the present invention.

FIG. 1 is a block diagram schematically illustrating a configuration of a sound processing system 1 according to this embodiment.

The sound processing system 1 includes a sound processing apparatus 10 and N+1 (where N is an integer greater than 1) sound collecting units 11-0 to 11-N. In the following description, each or all of the N+1 sound collecting units 11-0 to 11-N may be collectively simply referred to as sound collecting unit 11. Each sound collecting unit 11-$n$ (where n is an integer from 0 to N) is a microphone. The sound collecting unit 11-$n$ outputs a collected sound signal to the sound processing apparatus 10. Accordingly, the sound collecting unit 11 outputs sound signals of N+1 channels based on sound arriving as a whole to the sound processing apparatus 10.

The sound processing apparatus 10 includes a signal input unit 102, a peak detecting unit 103, a time difference calculating unit 104, a sound collection position calculating unit 105, a sound source direction calculating unit 106, a first transfer function calculating unit 107, a transfer function storage unit 108, and a second transfer function calculating unit 109.

The sound signal from each sound collecting unit 11-$n$ is input to the signal input unit 102. In the following description, the sound signal input from the sound collecting unit 11-$n$ may be referred to as a sound signal of channel n. The sound signal of each channel is a digital signal including signal values of a plurality of samples.

The signal input unit 102 outputs the input sound signals of N+1 channels to the peak detecting unit 103. The signal input unit 102 is, for example, a data input interface.

The sound signals of N+1 channels are input to the peak detecting unit 103 from the signal input unit 102. The peak detecting unit 103 detects a peak (local maximum value) of the signal value indicated by the sound signal of any one channel (for example, channel 0) and extracts the sound signals of channels within a predetermined time (for example, 30 ms) from a sampling time at which the peak is detected. The extracted sections of the respective channels are the same and the length of the sections only has to be equal to or greater than a length with which at least frequency analysis is possible. By extracting the sound signals around the peak, portions including target sound such as speech emitted from a person or musical sound are extracted and portions mainly including noise are excluded.

The peak detecting unit 103 smoothes the signal values by taking a moving average of the signal values in a section of an average length in advance for each sample constituting the sound signals at the time of detecting the peak of the sound signals. The influence of noise mixed into the sound signals, a pulse of which the signal value varies suddenly, or the like can be excluded by the smoothing. The peak detecting unit 103 differentiates the smoothed signal values in the samples and determines a sample, of which the obtained differentiated value varies from a positive value greater than 0 to a negative value less than 0, as a peak.

The peak detecting unit 103 outputs the extracted sound signals of N+1 channels to the time difference calculating unit 104 and the first transfer function calculating unit 107.

The time difference calculating unit 104 calculates a time difference of the sound signals of N+1 channels, which have been input from the peak detecting unit 103, for every set of two channels (channel pair). The calculated time difference represents a difference in timing at which sound waves arrives at the sound collecting unit 11 corresponding to two channels from the sound source. The time difference calculating unit 104 outputs time difference information indicating the time difference of each channel pair to the sound collection position calculating unit 105 and the sound source direction calculating unit 106. The process of calculating the time difference will be described later.

The sound collection position calculating unit 105 sequentially calculates the sound collection position on the basis of the time difference information input from the time difference calculating unit 104. The sound collection position calculating unit 105 calculates the sound collection position using a simultaneous localization and mapping (SLAM) method.

The sound collection position calculating unit 105 predicts sound source state information $\xi_{k|k-1}$ at that timing (at the current timing k) from past (for example, at the previous time k−1) sound source state information $\xi_{k-1}$, and updates current sound source state information $\xi_k$ on the basis of the time difference information input from the time difference calculating unit 104. The sound source state information $\xi_k$ at the timing k includes information indicating, for example, a sound source position $(x_k, y_k)$ and a position (sound collection position) $(m_{n,x}, m_{n,y})$ and an observation time error $m_{n,\tau}$ of each sound collecting unit 11-$n$. The sound collection position calculating unit 105 updates the sound source state information so as to reduce an error between the time difference indicated by the time difference information and the time difference based on the predicted sound source state information at the time of estimating the sound source state information. The sound collection position is given by the updated sound source state information.

The sound collection position calculating unit 105 uses, for example, an extended Kalman filter (EKF) method to predict and update the sound source state information. The predicting and updating of the sound source state information in the sound collection position calculating unit 105 will be described later.

The sound collection position calculating unit 105 outputs the updated sound source state information to the sound source direction calculating unit 106.

The output sound source state information includes information indicating the estimated sound source position.

The configuration of the sound collection position calculating unit 105 will be described later.

The sound source direction calculating unit 106 calculates a sound source direction d on the basis of the time difference information input from the time difference calculating unit 104 and the sound source state information input from the sound collection position calculating unit 105. The sound source direction calculating unit 106 predicts and updates the sound source state information using the same method as in the sound collection position calculating unit 105 at the time of calculating the sound source direction d. The sound source direction calculating unit 106 uses the sound source state information input from the sound collection position calculating unit 105 as an initial value of the sound source state information and treats the position $(m_{n,x}, m_{n,y})$ of each sound collecting unit 11-$n$ and the observation time error $m_{n,\tau}$ of channel n out of the input sound source state information as constant values. In other words, the sound source direction calculating unit 106 predicts and updates the sound source position $(x_k, y_k)$ as a variable value.

In the SLAM method, the sound collection position may be calculated more accurately than the sound source position. Accordingly, the sound source direction calculating unit 106 lowers the degree of freedom by keeping the sound collection position calculated by the sound collection position calculating unit 105 constant and repeatedly predicts and updates the sound source state information, whereby it is possible to improve the estimation accuracy of the sound source position. The sound source direction calculating unit 106 calculates the sound source direction on the basis of the calculated sound source position and the sound collection position calculated by the sound collection position calculating unit 105. For example, the sound source direction may be a direction of a sound source with respect to the centroid point of N+1 sound collecting units 11-0 to 11-N or may be a direction of a sound source with respect to the center of a circumference on which the sound collecting units are arranged.

The sound source direction calculating unit 106 outputs sound source direction information indicating the calculated sound source direction to the first transfer function calculating unit 107. The configuration of the sound source direction calculating unit 106 will be described later.

The sound signals of N+1 channels are input to the first transfer function calculating unit 107 from the peak detecting unit 103. A predetermined sound signal out of the sound signals of N+1 channels is referred to as a representative channel and the other channels are referred to as target channels. In the following description, it is assumed that the representative channel is channel 0 and the target channels are channels 1 to N. The first transfer function calculating unit 107 calculates a transfer function $A_{[d][n]}$ of a target channel on the basis of the sound signals of target channels n and the sound signal of representative channel 0. The calculated transfer function $A_{[d][n]}$ is referred to as a first transfer function $A_{[d][n]}$. The first transfer function calculating unit 107 stores the sound source direction information input from the sound source direction calculating unit 106 and first transfer function information indicating the calculated first transfer function $A_{[d][n]}$ in the transfer function storage unit 108 in correlation with each other. The process of calculating the first transfer function will be described later.

In the transfer function storage unit 108, the sound source direction information and the first transfer function information are stored in correlation with each other by the first transfer function calculating unit 107. By sequentially accumulating a set of the sound source direction information and the first transfer function information stored in correlation, first transfer function data is formed in the transfer function storage unit 108. An example of the first transfer function data will be described later.

The second transfer function calculating unit 109 interpolates the first transfer functions corresponding to the sound source direction information on the basis of the sound source direction indicated by the sound source direction information and a target sound source direction (target sound source direction) with reference to the first transfer function data stored in the transfer function storage unit 108. A second transfer function corresponding to the target sound source direction is calculated by the interpolation. The second transfer function calculating unit 109 uses, for example, a frequency-time domain linear interpolation (FT-DLI) method to interpolate the first transfer function.

The second transfer function calculating unit 109 may set a plurality of target sound source directions in advance and may calculate the second transfer function corresponding to each target sound source direction. The calculating of the second transfer function by the second transfer function calculating unit 109 will be described later.

Arrangement Example of Sound Source and Sound Collecting Units

An arrangement example of the sound source and the sound collecting units 11-$n$ will be described below.

Figure 2:
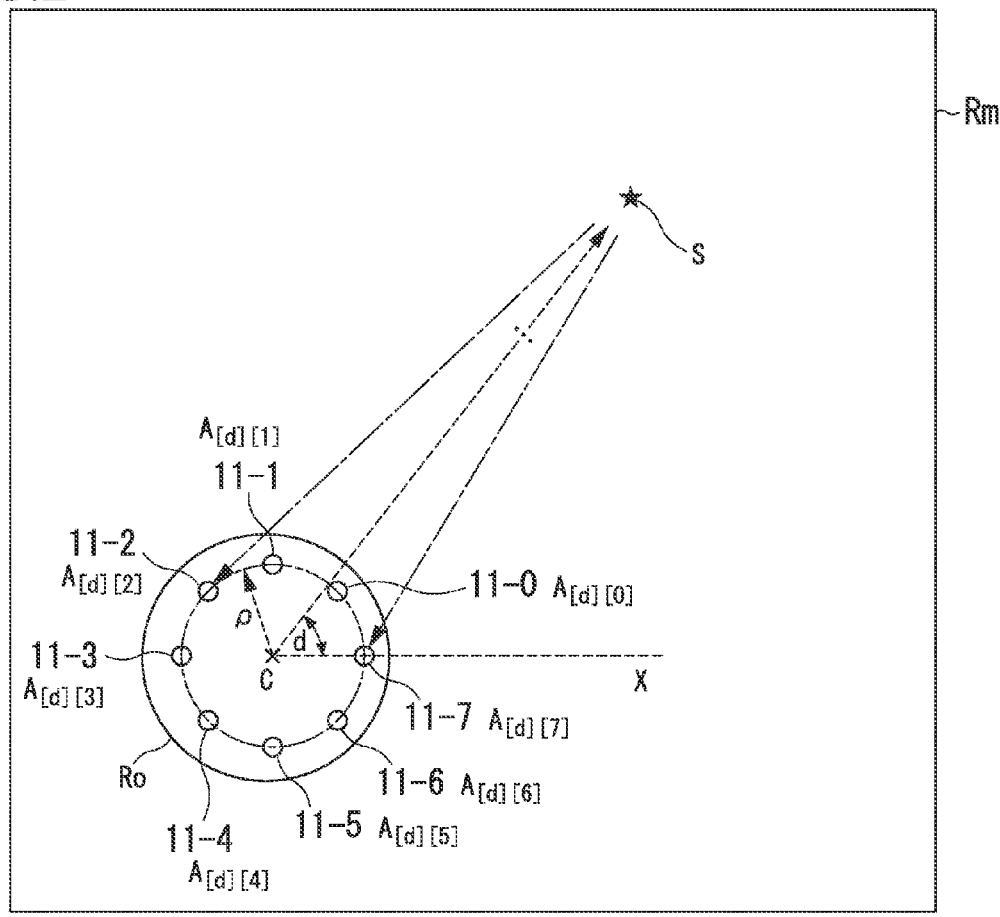
FIG. 2 is a plan view illustrating an arrangement example of a sound source and sound collecting units.

FIG. 2 is a plan view illustrating an arrangement example of the sounds source S and the sound collecting units 11-$n$.

In FIG. 2, an X direction is directed to the right side with respect to the drawing. In the example illustrated in FIG. 2, a sound source S and 8 (N+1) sound collecting units 11-0 to 11-7 are arranged in a room Rm. The sound collecting units 11-0 to 11-7 are fixed at equal intervals on a circumference with a predetermined radius p from the center C of a head of a robot (moving object) Ro. Accordingly, the position of each sound collecting unit 11-$n$ varies with movement of the robot Ro and a variation in posture thereof. The sound collecting units 11-0 to 11-7 are arranged at different positions and the positional relationship therebetween is fixed, whereby a microphone array is formed.

The sound source S is an actual object (an object such as a person, a musical instrument, or an acoustic instrument) generating sound. The sound source direction d is a direction of the sound source S with respect to the X axis direction from the center C of the positions of eight sound collecting units 11-0 to 11-7.

$A_{[d][0]}$ to $A_{[d][7]}$ represent transfer functions of the sound collecting units 11-0 to 11-7 in the sound source direction d, that is, transfer functions from the sound source S disposed in the sound source direction d to the sound collecting units 11-0 to 11-7. In the following description, the transfer functions $A_{[d][0]}$ to $A_{[d][7]}$ of the sound collecting units 11-0 to 11-7 in the sound source direction d in a two-dimensional plane are treated.

In the following description, the position of each sound collecting unit 11-$n$ (where n is an integer from 0 to N) may be referred to as a sound collection position or a sound collection position of channel n. The position of the representative point (for example, the centroid point) of the microphone array including N+1 sound collecting units 11-0 to 11-N may be referred to as "position of the sound collecting unit 11". As will be described later, the transfer functions $A_{[d][0]}$ to $A_{[d][7]}$ can be obtained for each frequency ω and the mark of the frequency ω may not be mentioned in the drawings or the following description.

Time Difference Calculating Process

The time difference calculating process in the time difference calculating unit 104 (FIG. 1) will be described below.

The time difference calculating unit 104 calculates the time difference for each channel pair of the sound signals of N+1 channels input from the peak detecting unit 103. The time difference calculating unit 104 calculates the time difference of a channel pair including channels n and m corresponding to two sound collecting units 11-$n$ and 11-$m$ (where m is an integer from 0 to N, m≠n) of which the sound collection positions geometrically neighbors each other out of N·(N−1)/2 channel pairs. N·(N−1)/2 is the total number of channel pairs when N+1 sound collecting units 11-0 to 11-N are arranged circumferentially.

In the time difference calculating unit 104, channel pairs corresponding to the other sound collecting units 11-$m$ within a predetermined range from one sound collecting unit 11-$n$ are set in advance as a channel pair of which the time difference should be calculated. The channel pair including channels n and m is referred to as neighboring channel pair.

Figure 3:
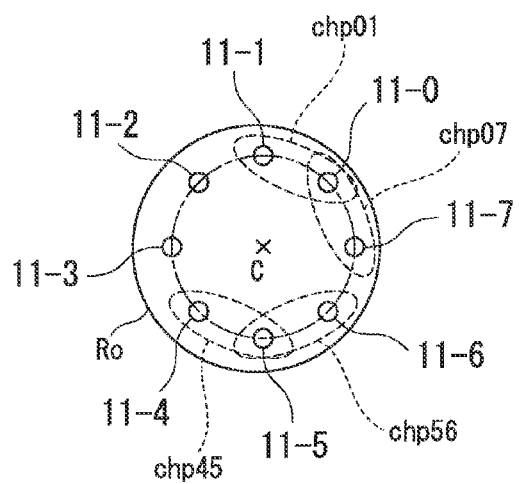
FIG. 3 is a diagram illustrating a setting example of neighboring channel pairs.

FIG. 3 is a diagram illustrating a setting example of a neighboring channel pair.

In the example illustrated in FIG. 3, neighboring channel pairs of which one channel is channel 0 corresponding to the sound collecting unit 11-0 include a neighboring channel pair chp01 including a set of channel 0 and channel 1 corresponding to the sound collecting unit 11-1 and a neighboring channel pair chp07 including a set of channel 0 and channel 7 corresponding to the sound collecting unit 11-7. Neighboring channel pairs of which one channel is channel 5 corresponding to the sound collecting unit 11-5 include a neighboring channel pair chp45 including a set of channel 5 and channel 4 corresponding to the sound collecting unit 11-4 and a neighboring channel pair chp56 including a set of channel 5 and channel 6 corresponding to the sound collecting unit 11-6. When one channel is the other channels, the neighboring channel pairs can be similarly determined.

All the neighboring channel pairs set in the time difference calculating unit 104 only have to include channels 0 to N as one channel of each neighboring channel pair. For example, all the neighboring channel pairs only have to include channel pairs forming neighboring sound collecting units, that is, the neighboring channel pair chp01 including channel 0 and channel 1, chp12, chp23, chp34, chp45, chp56, chp67, and chp07.

The time difference $\Delta_{tmn,k}$ between channels m and n calculated for a neighboring channel pair chpmn will be described below.

Figure 4:
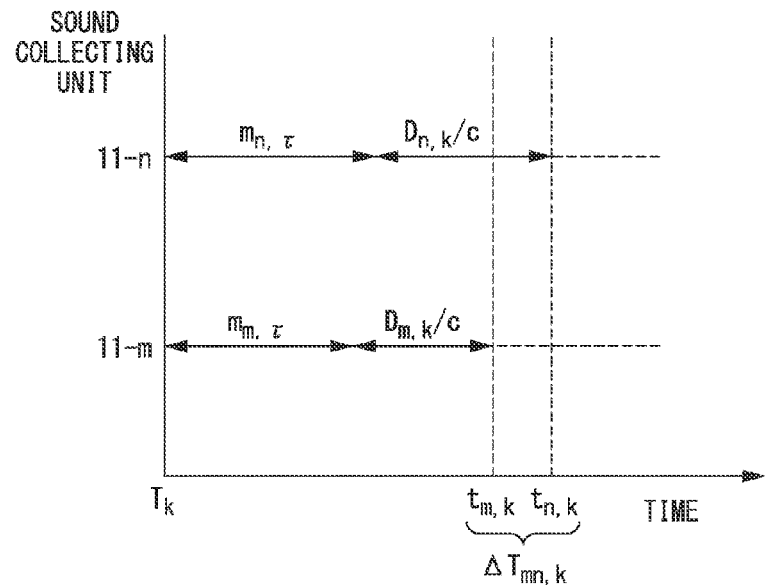
FIG. 4 is a diagram illustrating observation times of sound observed by channels.

FIG. 4 is a diagram illustrating observation timings $t_{m,k}$ and $t_{n,k}$ of sound observed through channels m and n. The horizontal axis represents the timing.

The time difference $\Delta_{tmn,k}$ is a time $t_{n,k}-t_{m,k}$ between the observation timing $t_{n,k}$ and the observation timing $t_{m,k}$. In the observation time of each channel, an observation timing error is added to the propagation time of sound waves from the sound source S.

The observation timing $t_{m,k}$ is a timing at which sound waves are observed by the sound collecting unit 11-$m$ when the sound source S emits sound at the timing $T_k$. The observation timing $t_{m,k}$ is a timing obtained by adding a propagation time $D_{m,k/c}$ of sound waves from the sound source S to the sound collecting unit 11-$m$ to an observation timing error $m_{n,\tau}$ of channel m at the timing $T_k$. Here, $D_{m,k}$ represents the distance from the sound source S to the sound collecting unit 11-$m$. c represents the sound speed. The observation timing $t_{m,k}$ is a timing obtained by adding a propagation time $D_{n,k/c}$ of sound waves from the sound source S to the sound collecting unit 11-$n$ to an observation timing error $m_{n,\tau}$ of channel n at the timing $T_k$. $D_{m,k}$ represents the distance from the sound source S to the sound collecting unit 11-$n$. Accordingly, the time difference $\Delta_{tmn,k}$ is expressed by Expression (1).

$$\Delta t_{mn,k} = \frac{D_{n,k} - D_{m,k}}{c} + m_{n,\tau} - m_{m,\tau} \tag{1}$$

In Expression (1), the propagation time $D_{n,k}$ is a function of the sound source position ($x_k$, $y_k$) and the sound collection position ($m_{n,x}$, $m_{n,y}$) of channel n, as expressed by Expression (2).

$$D_{n,k} = \sqrt{(x_k - m_{n,x})^2 + (y_k - m_{n,y})^2} \tag{2}$$

The propagation time $D_{m,k}$ is given by substituting the sound collection position ($m_{m,x}$, $m_{m,y}$) of channel m for the sound collection position ($m_{n,x}$, $m_{n,y}$) of channel n in Expression (2).

Accordingly, the time difference $\Delta_{tm,k}$ is a function of the observation timing errors $m_{m,\tau}$ and $m_{n,\tau}$, the sound source position ($x_k$, $y_k$), and the sound collection positions ($m_{m,x}$, $m_{m,y}$) and ($m_{n,x}$, $m_{n,y}$) of channels m and n, that is, the aforementioned sound source state information.

The time difference calculating unit 104 generates an observed value vector $\zeta_k$ at the timing k having the calculated time difference for each channel pair as an element and outputs the generated observed value vector $\zeta_k$ as the time difference information to the sound collection position calculating unit 105.

Configuration of Sound Collection Position Calculating Unit

The configuration of the sound collection position calculating unit 105 will be described below with reference to FIG. 1 again.

The sound collection position calculating unit 105 calculates the sound collection position using the SLAM method based on the EKF on the basis of the time difference information input from the time difference calculating unit 104. At the time of calculating the sound collection position, the sound collection position calculating unit 105 updates the sound source state information $\xi_k$ at current timing k so as to reduce an error between the observed value vector $\zeta_k$ at the current timing k and the observed value vector $\zeta_{k|k-1}$ calculated on the basis of the sound source state information $\xi_{k|k-1}$ at the current timing k predicted from the previous timing k−1. The updated sound source state information $\xi_k$ and the predicted sound source state information $\xi_{k|k-1}$ are information including the sound collection position ($m_{n,x}$, $m_{n,y}$) of channel n at the timing k. The process of calculating the sound source state information $\xi_{k|k-1}$ will be described later.

The sound collection position calculating unit 105 includes a state updating unit 1051, a state predicting unit 1052, a Kalman gain calculating unit 1054, and a convergence determining unit 1055.

The state updating unit 1051 adds an observation error vector $\delta_k$ to the observed value vector $\zeta_k$ at the current timing indicated by the time difference information input from the time difference calculating unit 104 and updates the observed value vector $\zeta_k$ to the added value obtained by the addition. The observation error vector $\delta_k$ has an average value of 0 and is a random number vector in which the distribution is based on a Gaussian distribution with a predetermined covariance. A matrix having the covariance values as elements of the rows and columns is denoted by a covariance matrix Q.

The state updating unit 1051 updates the sound source state information $\xi_k$ at the current timing k, for example, using Expression (3) on the basis of the observed value vector $\zeta_k$ at the current timing k indicated by the input time difference information.

$$\xi_k = \xi_{k|k-1} + K_k(\zeta_k - \zeta_{k|k-1}) \quad (3)$$

In Expression (3), the sound source state information $\xi_{k|k-1}$ at the current timing k represents the sound source state information at the current timing k predicted from the sound source state information at the previous timing k−1. $K_k$ represents a Kalman gain at the current timing k. The observed value vector $\zeta_{k|k-1}$ represents the observed value vector at the current timing k predicted from the previous timing k−1. That is, Expression (3) represents that the sound source state information $\xi_k$ at the current timing k is calculated by adding a multiplied value vector $K_k(\zeta_k - \zeta_{k|k-1})$, which is obtained by multiplying a predictive residual $(\zeta_k - \zeta_{k|k-1})$ of the observed value vector at the current timing by the Kalman gain $K_k$, to the sound source state information $\xi_{k|k-1}$ at the current timing k predicted by the sound source state information at the previous timing k−1. The multiplied value vector $K_k(\zeta_k - \zeta_{k|k-1})$ corresponds to an amount of sound source state information $\xi_{k|k-1}$ updated. The sound source state information $\xi_{k|k-1}$ and the observed value vector $\zeta_{k|k-1}$ are input from the state predicting unit 1052 and the Kalman gain $K_k$ is input from the Kalman gain calculating unit 1054.

The state updating unit 1051 calculates a covariance matrix $P_k$ at the current timing k, for example, using Expression (4) on the basis of the covariance matrix $P_{k|k-1}$ at the current timing k predicted from the Kalman gain $K_k$, the matrix $H_k$, and the covariance matrix $P_{k-1}$ at the previous timing k−1.

$$P_k = (I - K_k H_k) P_{k|k-1} \quad (4)$$

In Expression (4), I represents a unit matrix. That is, Expression (4) expresses that the covariance matrix $P_k$ at the current timing k is calculated by multiplying the covariance matrix $P_{k|k-1}$ by a matrix which is obtained by subtracting the product of the Kalman gain $K_k$ and the matrix $H_k$ from the unit matrix I. Since the covariance matrix $P_k$ represents the magnitude of the error of the sound source state information $\xi_k$, Expression (4) represents that the covariance matrix $P_{k|k-1}$ is updated to $P_k$ so as to reduce the magnitude of the error of the sound source state information $\xi_k$. The matrix $H_k$ is input from the Kalman gain calculating unit 1054.

The state updating unit 1051 outputs the covariance matrix $P_k$ and the sound source state information $\xi_k$ at the current timing k to the state predicting unit 1052. The state updating unit 1051 outputs the sound source state information $\xi_k$ to the convergence determining unit 1055.

The sound source state information $\xi_{k-1}$ and the covariance matrix $P_{k-1}$ at the previous timing k−1 are input to the state predicting unit 1052 from the state updating unit 1051. The state predicting unit 1052 predicts the sound source state information $\xi_{k|k-1}$ at the current timing k from the sound source state information $\xi_{k-1}$ at the previous timing k−1 and predicts the covariance matrix $P_{k|k-1}$ at the current timing k from the covariance matrix $P_{k-1}$ at the previous timing k−1.

Here, the state predicting unit 1052 calculates the sound source state information $\xi_{k|k-1}$ at the current timing k by adding a displacement $(\Delta x, \Delta y)^T$, which is obtained by adding an error vector $\varepsilon_k$ indicating an error of the displacement to a predetermined displacement $(\Delta x', \Delta y')^T$ up to the current timing k, to the sound source position $(x_{k-1}, y_{k-1})$ indicated by the sound source state information $\xi_{k-1}$ at the previous timing k−1. $(\ldots)^T$ represents the transpose of a vector or a matrix. The error vector $\varepsilon_k$ has an average value of 0 and is a random number vector in which the distribution is based on a Gaussian distribution. A matrix having covariance values indicating characteristics of the Gaussian distribution as elements of the rows and columns is denoted by a covariance matrix R. Specifically, the state predicting unit 1052 calculates the sound source state information $\xi_{k|k-1}$ at the current timing k using Expression (5).

$$\xi_{k|k-1} = \xi_{k-1} + F_\xi^T \begin{bmatrix} \Delta x \\ \Delta y \end{bmatrix} \quad (5)$$

In Expression (5), the matrix $F_\eta$ is a matrix (of two rows and 3N+5 columns) expressed by Expression (6).

$$F_\eta = \begin{bmatrix} 1 & 0 & 0 & 0 & \ldots & 0 \\ 0 & 1 & 0 & 0 & \ldots & 0 \end{bmatrix} \quad (6)$$

The displacement $(\Delta x', \Delta y')^T$ is given on the basis of a predetermined movement model of a sound source. The movement model is, for example, a random walk model. Specifically, in the random walk model, a random number vector of which the average value is 0 and in which the distribution is based on a Gaussian distribution with a predetermined variance is used as the displacement $(\Delta x, \Delta y)^T$.

On the other hand, the state predicting unit 1052 calculates the covariance matrix $P_{k|k-1}$ at the current timing k, for example, using Expression (7) from the covariance matrix $P_{k-1}$ at the previous timing k−1.

$$P_{k|k-1} = P_{k-1} + F_\eta^T R F_\eta^T \quad (7)$$

Expression (7) represents that the covariance matrix $P_{k|k-1}$ at the current timing k is predicted by adding the covariance matrix R indicating an error distribution of the displacement to the covariance matrix $P_{k-1}$ at the previous timing k−1.

The state predicting unit 1052 calculates the time difference for each channel pair given by Expressions (1) and (2) on the basis of the calculated sound source state information $\xi_{k|k-1}$ at the current timing k and generates the observed value vector $\zeta_{k|k-1}$ at the current timing k having the calculated time differences as elements.

The state predicting unit 1052 outputs the sound source state information $\xi_{k|k-1}$, the covariance matrix $P_{k|k-1}$, and the observed value vector $\zeta_{k|k-1}$ at the timing k to the state updating unit 1051 and the Kalman gain calculating unit 1054.

The Kalman gain calculating unit 1054 calculates the Kalman gain $K_k$, for example, using Expression (8) on the basis of the aforementioned covariance matrix Q and the sound source state information $\xi_{k|k-1}$ and the covariance matrix $P_{k|k-1}$ at the timing k input from the state predicting unit 1052.

$$K_k = P_{k|k-1} H_k^T (H_k P_{k|k-1} H_k^T + Q)^{-1} \quad (8)$$

In Expression (8), $(\ldots)^{-1}$ represents an inverse matrix of a matrix .... The matrix $H_k$ is a Jacobian obtained by partially differentiating the elements of an observation function vector $h(\xi_{k|k-1})$ by the elements of the sound source state information $\xi_{k|k-1}$, as expressed by Expression (9).

$$H_k = \frac{\partial h(\xi_k)}{\partial \xi_k} \bigg|_{\xi_{k|k-1}} \quad (9)$$

In Expression (9), the observation function vector $h(\xi_k)$ represents the observed value vector $\zeta_k$ which is calculated on the basis of the sound source state information $\xi_k$. That is, the matrix $H_k$ is calculated by partially differentiating the elements (see Expression (1)) of the observed value vector $\zeta_{k|k-1}$ input from the state updating unit 1051.

The Kalman gain calculating unit 1054 outputs the calculated Kalman gain $K_k$ and the matrix $H_k$ to the state updating unit 1051.

The convergence determining unit 1055 determines whether the estimation error of the sound source state information $\xi_k$ input from the state updating unit 1051 converges. The convergence determining unit 1055 outputs the sound source state information $\xi_k$ to the sound source direction calculating unit 106 when it is determined that the estimation error converges.

For example, the convergence determining unit 1055 calculates the average distance $\Delta\xi_m$ between the sound collection position $(m_{n,x}, m_{n,y})$ indicated by the sound source state information $\xi_{k-1}$ at the previous timing k−1 and the sound collection position $(m_{n,x}, m_{n,y})$ indicated by the sound source state information $\xi_k$ at the current timing k. The convergence determining unit 1055 determines that the estimation error converges when the calculated average distance $\Delta\xi_m$ is less than a predetermined threshold value and determines that the estimation error does not converges otherwise.

Sound Source State Estimating Process

The sound source state estimating process which is performed by the sound collection position calculating unit 105 at the time of calculating the sound collection position will be described below.

Figure 5:
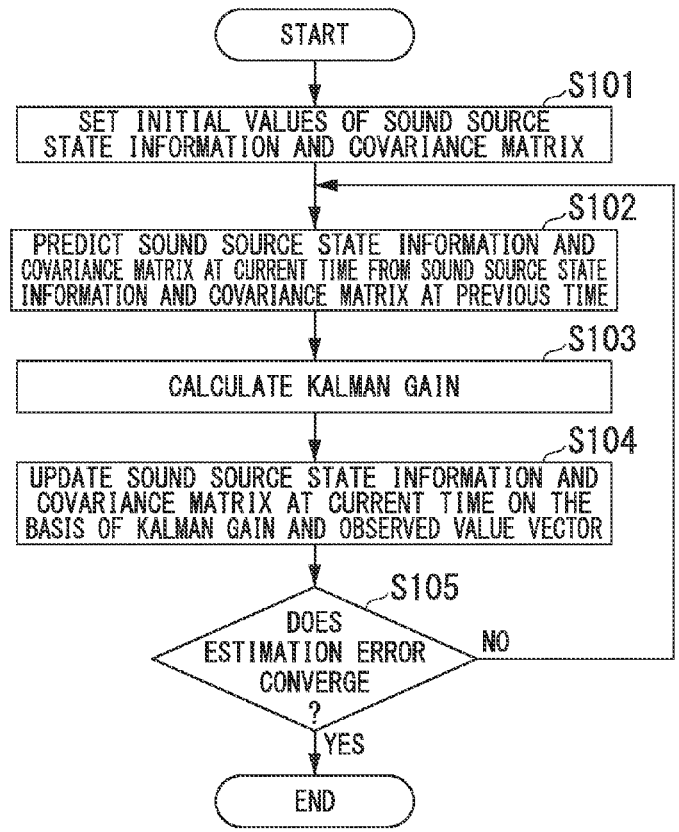
FIG. 5 is a flowchart illustrating a sound source state estimating process according to the first embodiment of the present invention.

FIG. 5 is a flowchart illustrating the sound source state estimating process according to this embodiment.

(Step S101) The state predicting unit 1052 sets the initial values of the sound source state information $\xi_{k-1}$ and the covariance matrix $P_{k-1}$. Thereafter, the process flow moves to step S102.

(Step S102) The state predicting unit 1052 predicts the sound source state information $\xi_{k|k-1}$ at the current timing k by adding the displacement $(\Delta x, \Delta y)^T$ to which the error vector $\varepsilon_k$ has been added to the sound source position $(x_{k-1},$ $y_{k-1})$ indicated by the sound source state information $\xi_{k-1}$ at the previous timing k−1 (Expression (5)).

The state predicting unit 1052 predicts the covariance matrix $P_{k|k-1}$ at the current timing k by adding the covariance matrix R indicating the error distribution of the displacement to the covariance matrix $P_{k-1}$ at the previous timing k−1 (Expression (7)).

Thereafter, the process flow moves to step S103.

(Step S103) The Kalman gain calculating unit 1054 calculates the Kalman gain $K_k$ on the basis of the covariance matrix Q indicating the distribution of the observation error and the predicted sound source state information $\xi_{k|k-1}$ and the covariance matrix $P_{k|k-1}$ at the current timing k (Expression (8)). Thereafter, the process flow moves to step S104.

(Step S104) The state updating unit 1051 calculates the sound source state information $\xi_k$ at the current timing by adding the multiplied value vector, which is obtained by multiplying the predictive residual $(\zeta_k - \zeta_{k|k-1})$ of the observed value vector at the current timing by the Kalman gain $K_k$, by the predicted sound source state information $\xi_{k|k-1}$' at the current timing k (Expression (3)).

The state updating unit 1051 calculates the covariance matrix $P_k$ at the current timing k by multiplying the covariance matrix $P_{k|k-1}$ by a matrix which is obtained by subtracting the product of the Kalman gain $K_k$ and the matrix $H_k$ from the unit matrix I (Expression (4)). Thereafter, the process flow moves to step S105.

(Step S105) The convergence determining unit 1055 determines whether the estimation error of the sound source state information $\xi_k$ converges. The convergence determining unit 1055 outputs the sound source state information $\xi_k$ to the sound source direction calculating unit 106 when it is determined that the estimation error converges (YES in step S105), and then ends the process flow illustrated in FIG. 5. The convergence determining unit 1055 updates the current timing k to the previous timing k−1 when it is determined that the estimation error does not converges (NO in step S105), and then the process flow moves to step S102.

Configuration of Sound Source Direction Calculating Unit

The configuration of the sound source direction calculating unit 106 will be described below with reference to FIG. 1 mainly in comparison with the sound collection position calculating unit 105.

The sound source direction calculating unit 106 calculates the sound collection position using the SLAM method based on the EKF on the basis of the time difference information input from the time difference calculating unit 104, similarly to the sound collection position calculating unit 105.

That is, the same process as the sound source state estimating process illustrated in FIG. 5 is performed. By this process, the sound source direction calculating unit 106 updates the sound source state information $\xi_k$ at the current timing k so as to reduce the error between the observed value vector $\zeta_k$ at the current timing k and the observed value vector $\zeta_{k|k-1}$ calculated on the basis of the sound source state information $\xi_{k|k-1}$ at the current timing predicted from the previous timing k−1. The updated sound source state information $\xi_k$ or the predicted sound source state information $\xi_{k|k-1}$ are information including the sound source position (x, y) of channel n at the timing k.

The sound source direction calculating unit 106 includes a state updating unit 1061, a state predicting unit 1062, a Kalman gain calculating unit 1064, and a convergence determining unit 1065. The state updating unit 1061, the state predicting unit 1062, the Kalman gain calculating unit 1064, and the convergence determining unit 1065 perform the same processes as the state updating unit 1051, the state predicting unit 1052, the Kalman gain calculating unit 1054, and the convergence determining unit 1055 of the sound collection position calculating unit 105.

The state predicting unit 1062 starts the process of calculating the sound source state information $\xi_{k|k-1}$ using the sound source state information $\xi_k$ input from the sound collection position calculating unit 105 as an initial value. The state updating unit 1061 and the state predicting unit 1062 perform a process of calculating the sound source state information $\xi_{k|k-1}$ and $\xi_k$ with the sound collection position $(m_{n,x}, m_{n,y})$ and the observation timing error $m_{n,\tau}$ of channel n included in the sound source state information $\xi_{k|k-1}$ and $\xi_k$ kept constant and with the other elements and the sound source position $(x_k, y_k)$ set to variables. Accordingly, the state updating unit 1061, the state predicting unit 1062, and the Kalman gain calculating unit 1064 process only the matrix elements associated with the sound source position $(x_k, y_k)$ in calculating the covariance matrices $P_{k|k-1}$ and $P_k$, the Kalman gain $K_k$, the matrix $H_k$, and the other matrices.

The convergence determining unit 1065 determines whether the estimation error of the sound source state information $\xi_k$ input from the state updating unit 1061 converges. When it is determined that the estimation error converges, the convergence determining unit 1065 calculates the sound source direction d on the basis of the sound source position $(x_k, y_k)$ indicated by the sound source state information $\xi_k$. The convergence determining unit 1065 outputs the sound source direction information indicating the calculated sound source direction d to the first transfer function calculating unit 107.

For example, the convergence determining unit 1065 calculates an average distance $\Delta\xi_s$ between the sound source position $(x_{k-1}, y_{k-1})$ indicated by the sound source state information $\xi_{k-1}$ at the previous timing k−1 and the sound source position $(x_k, y_k)$ indicated by the sound source state information $\xi_k$ at the current timing k. The convergence determining unit 1065 determines that the estimation error converges when the calculated average distance $\Delta\xi_s$ is less than a predetermined threshold value and determines that the estimation error does not converges otherwise.

First Transfer Function Calculating Process

The first transfer function calculating unit 107 calculates the transfer function $A_{[d][n]}$ of the target channel on the basis of a regression model from the sound signal of target channel n and the sound signal of representative channel 0 as described above. In the regression model, the observed values formed on the basis of the sound signals of representative channel 0 and target channel n are given by convolution of a regressor formed on the basis of the sound signal of representative channel 0 and the transfer function as a base parameter and it is assumed that the transfer function is constant within a predetermine observation time. In the regression model, the transfer function is calculated by removing the contribution of the regressor from the observed value. Accordingly, the first transfer function calculating unit 107 can calculate the transfer function of each target channel n on the basis of the sound signals collected by the sound collecting units 11-0 to 11-N without using a measuring sound source signal.

The process of calculating the first transfer function (the first transfer function calculating process) in the first transfer function calculating unit 107 will be described below.

Figure 6:
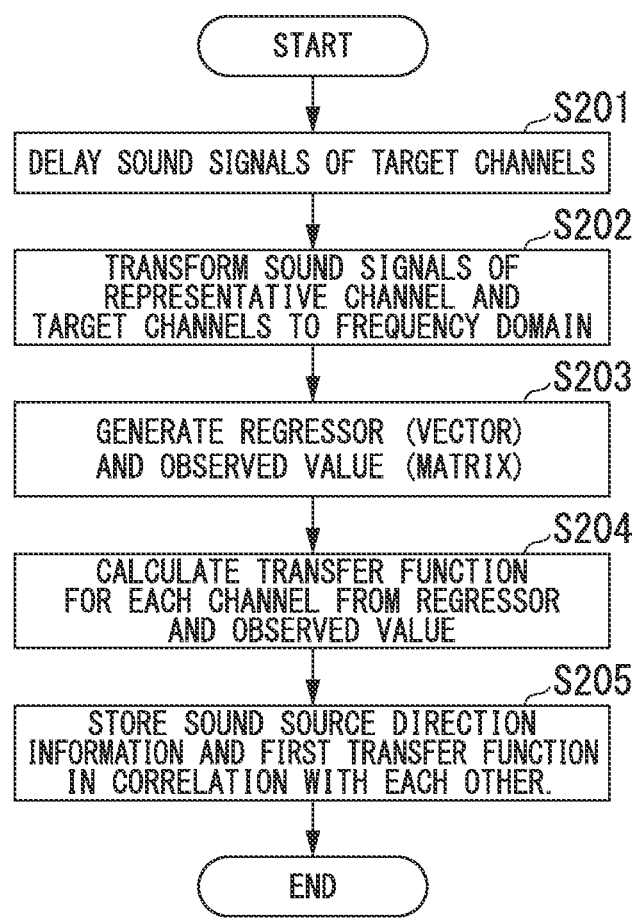
FIG. 6 is a flowchart illustrating a first transfer function calculating process according to the first embodiment of the present invention.

FIG. 6 is a flowchart illustrating the first transfer function calculating process according to this embodiment.

(Step S201) The first transfer function calculating unit 107 delays the sound signal of each target channel n by a predetermined delay time T. The delay time T is used to delay the sound signal of each target channel n from the sound signal of representative channel 0 regardless of the positional relationship between the sound source and the sound collecting units 11. For example, when N+1 sound collecting units 11-0 to 11-N are arranged on a common circumference (FIG. 2), the delay time T can be longer than the time in which a sound wave propagates over a distance corresponding to the diameter of the circumference. Thereafter, the process flow moves to step S202.

(Step S202) The first transfer function calculating unit 107 transforms the sound signal $x_0$ of representative channel and the sound signals $x_n$ of target channels to a frequency domain for each frame including a predetermined number of samples L and calculates transformation coefficients $X_0(\omega)$ and $X_n(\omega)$. Here, $\omega$ represents the frequency. Then, the first transfer function calculating unit 107 integrates the transformation coefficients $X_0(\omega)$ and $X_n(\omega)$ calculated for each frame by predetermined F frames. Here, F is a predetermined number of frame and is, for example, 8. In the following description, the transformation coefficients calculated at a frame f are denoted by $X_{0,f}(\omega)$ and $X_{n,f}(\omega)$. Thereafter, the process flow moves to step S203.

(Step S203) The first transfer function calculating unit 107 generates a regressor (vector) $\Phi$ having transformation coefficients $X_{0,f}(\omega)$ of representative channel corresponding to F frames as elements. The regressor $\Phi$ is $[X_{0,1}(\omega), X_{0,2}(\omega), \ldots, X_{0,F}(\omega)]^T$.

The first transfer function calculating unit 107 generates an observed value (matrix) X having the transformation coefficients of N+1 channels corresponding to F frames as elements. The observed value X is a matrix having transformation coefficient vectors $X_0, X_1, \ldots, X_{N+1}$ of N+1 channels as elements. Specifically, the observed value X is $[X_0(\omega), X_1(\omega), \ldots, X_N(\omega)]^T$. The transformation coefficient vector $X_n(\omega)$ of channel n is $[X_{n,1}(\omega), X_{n,2}(\omega), \ldots, X_{n,F}(\omega)]^T$. Thereafter, the process flow moves to step S204.

(Step S204) The first transfer function calculating unit 107 calculates the transfer functions $A_{[d][0]}, A_{[d][1]}, \ldots, A_{[d][N]}$ for channels from the generated observed value X and the generated regressor $\Phi$ using Expression (10).

$$A^T(\omega) = (\Phi\Phi^T)^{-1}\Phi^T X \quad (10)$$

In Expression (10), $A^T(\omega)$ represents a transfer function vector having the transfer functions $A_{[d][n]}$ of channels as elements. That is, $A^T(\omega)$ is $[A_{[d][0]}, A_{[d][1]}, \ldots, A_{[d][N]}]$. $(\Phi\Phi^T)^{-1}\Phi^T$ corresponds to the pseudo-inverse matrix of the regressor $\Phi$ (one-column matrix). That is, Expression (10) represents that the transfer function vector $A^T(\omega)$ is calculated by approximately dividing the observed value X by the regressor $\Phi$. Thereafter, the process flow moves to step S205.

(Step S205) The first transfer function calculating unit 107 extracts the transfer functions $A_{[d][1]}(\omega), \ldots, A_{[d][N]}(\omega)$ of the target channels as the first transfer functions from the calculated transfer function vector $A^T(\omega)$. The first transfer function calculating unit 107 may ignore the transfer function $A_{[d][0]}(\omega)$ of the representative channel. Since the sound signal of the representative channel is used as the regressor $\Phi$, the transfer function $A_{[d][0]}(\omega)$ does not have a significant value.

The first transfer function calculating unit 107 stores the sound source direction information indicating the sound source direction d input from the sound source direction calculating unit 106 and the first transfer function information indicating the calculated first transfer function $A_{[d][n]}(\omega)$ in the transfer function storage unit 108 in correlation with each other. Thereafter, the process flow illustrated in FIG. 6 ends.

Example of First Transfer Function Data

An example of the first transfer function data stored in the transfer function storage unit 108 will be described below.

FIG. 7 is a diagram illustrating an example of the first transfer function data according to this embodiment.

In the example illustrated in FIG. 7, the sound source direction d indicated by the sound source direction information and the transfer functions $A_{[d][1]}(\omega)$, $A_{[d][2]}(\omega), \ldots, A_{[d][7]}(\omega)$ of channels 1 to 7 indicated by the first transfer function information are correlated with each other. For example, as illustrated in the second row of FIG. 7, the sound source direction 13° is correlated with the transfer function 0.24+0.35j (where j is an imaginary unit) of channel 1, the transfer function 0.44−0.08j of channel 2, the transfer function 0.40+0.29j of channel 3, the transfer function 0.18+0.51j of channel 4, the transfer function −0.37+0.32j of channel 5, the transfer function of −0.14+0.48j of channel 6, and the transfer function 0.15+0.29j of channel 7.

Since the transformation of the sound signals of the channels to the frequency domain is performed for each frame including a predetermined number of samples L, the transfer functions of the channels are actually given to L/2 frequencies in each sound source direction d. For the purpose of simplification, only one frequency of L/2 frequencies ω is illustrated in FIG. 7.

The sound source directions corresponding to the first transfer functions may be irregularly arranged in the rows. For example, the sound source directions illustrated in the first, second, and third rows of the first column in FIG. 7 are 13°, 29°, and 35°, respectively. This irregular arrangement is caused by allowing the first transfer function calculating unit 107 to store the sound source direction information indicating the calculated sound source direction in the transfer function storage unit 108 every time.

Accordingly, the first transfer function calculating unit 107 may change the order of the sets of the sounds source direction information and the first transfer function information such that the sound source directions indicated by the sound source direction information are arranged in the ascending order or the descending order. Accordingly, the second transfer function calculating unit 109 can efficiently search for the sound source direction information to be referred to.

When the same sound source direction as a sound source direction d newly calculated by the sound source direction calculating unit 106 or a sound source direction within a predetermined range from the sound source direction is included in the sound source direction indicated by the sound source direction information stored in the transfer function storage unit 108, the first transfer function calculating unit 107 may replace the first transfer function information stored in correlation with the sound source direction information with the newly-generated first transfer function information.

Second Transfer Function Calculating Process

The second transfer function calculating unit 109 specifies the sound source direction information to be referred to from the first transfer function data stored in the transfer function storage unit 108 on the basis of a target sound source direction. In the following description, the sound source direction to be referred to is referred to as a reference sound source direction, and the information indicating the reference sound source direction is referred to as reference sound source direction information. The second transfer function calculating unit 109 calculates the second transfer functions corresponding to the target sound source direction by interpolating the first transfer functions corresponding to the specified reference sound source direction using the FTDLI method. The FTDLI method is a method of interpolating the phases and the amplitudes of the first transfer functions in the reference sound source direction on the basis of the target sound source direction and constructing the second transfer functions with the phases and the amplitudes obtained by the interpolation.

Specifically, the second transfer function calculating unit 109 performs an interpolation process to be described below.

Figure 8:
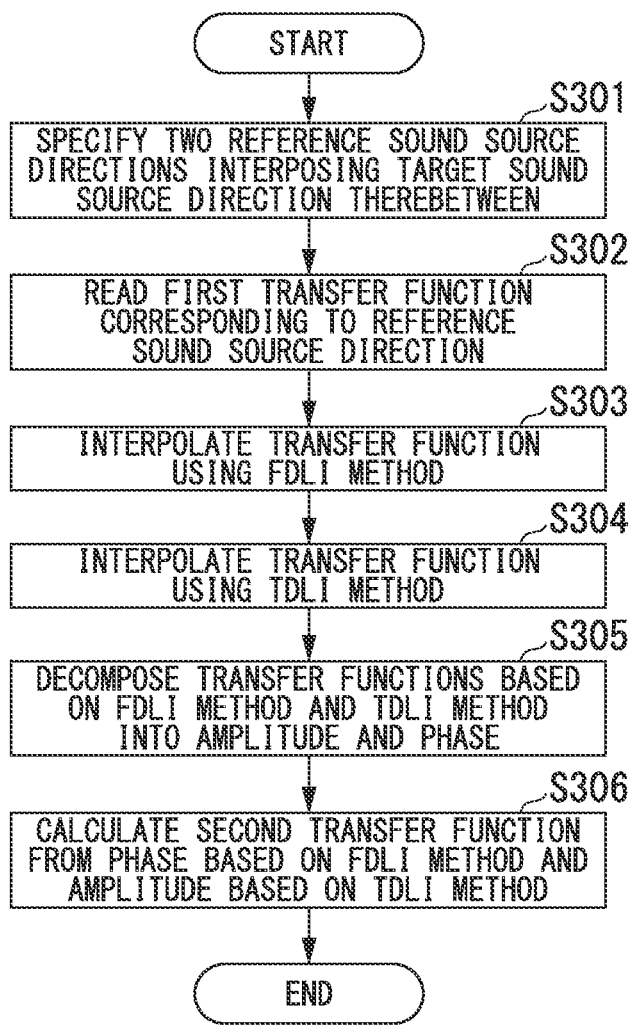
FIG. 8 is a flowchart illustrating an interpolation process according to the first embodiment of the present invention.

FIG. 8 is a flowchart illustrating the interpolation process according to this embodiment.

Figure 9:
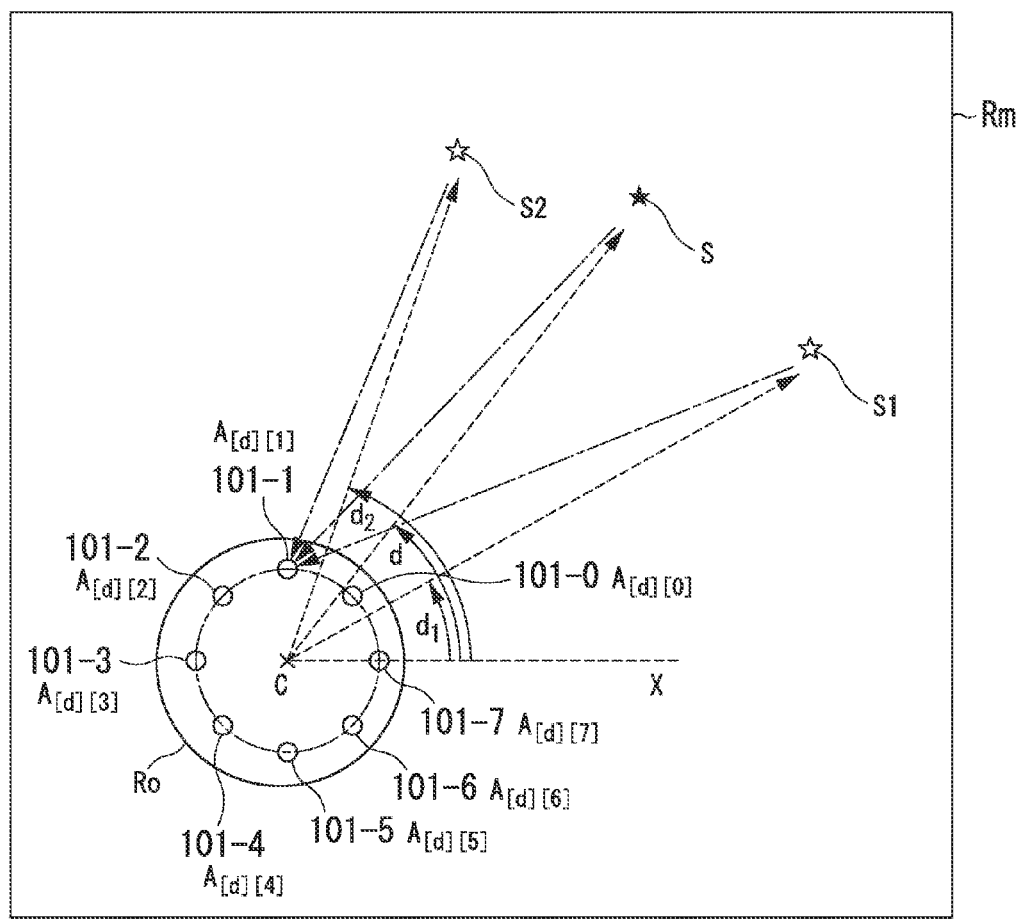
FIG. 9 is a diagram illustrating an example of a target sound source direction and reference sound source directions.

(Step S301) The second transfer function calculating unit 109 specifies sound source direction information indicating neighboring sound source directions $d_1$ and $d_2$ as two sound source directions interposing the target sound source direction d therebetween as the reference sound source direction information (see FIG. 9). In FIG. 9, the sound source directions $d_1$ and $d_2$ indicate the directions of sound sources S1 and S2. Thereafter, the process flow moves to step S302.

(Step S302) The second transfer function calculating unit 109 reads the first transfer function information corresponding to the specified reference sound source direction information from the transfer function storage unit 108. Thereafter, the process flow moves to step S303.

(Step S303) The second transfer function calculating unit 109 calculates a transfer function $A_{m[F]}(\omega)$ by interpolating the first transfer functions $A_{[d1][n]}(\omega)$ and $A_{[d2][n]}(\omega)$ indicated by the read first transfer function information using the FDLI method. The second transfer function calculating unit 109 uses Expression (11) to calculate the transfer function $A_{m[F]}(\omega)$.

$$A_{m[F]}'(\omega) = \delta_1 A_{[d1][n]}(\omega) + \delta_2 A_{[d2][n]}(\omega) \qquad (11)$$

In Expression (11), $\delta_1$ and $\delta_2$ are interpolation coefficients. The interpolation coefficients $\delta_1$ and $\delta_2$ are coefficients of the degrees of contribution of the first transfer functions $A_{[d1][n]}(\omega)$ and $A_{[d2][n]}(\omega)$ corresponding to the reference sound source directions $d_1$ and $d_2$, respectively.

The interpolation coefficient $\delta_1$ is a ratio $|(d_2-d_1)/(d-d_1)|$ of the angle $(d_2-d_1)$ between the reference sound source directions to the angle $(d-d_1)$ between the reference sound source direction $d_1$ and the target sound source direction d, and the interpolation coefficient $\delta_2$ is a ratio $|(d_2-d_1)/(d_2-d)|$ of the angle $(d_2-d_1)$ between the reference sound source directions to the angle $(d_2-d)$ between the reference sound source direction $d_2$ and the target sound source direction d. That is, the transfer function $A_{m[F]}$ is an arithmetic mean using the reciprocal of an internal division ratio of the first transfer functions $A_{[d1][n]}(\omega)$ and $A_{[d2][n]}(\omega)$ corresponding to two reference sound source directions $d_1$ and $d_2$ by the target sound source direction d as a weighting coefficient. The interpolation coefficients are given such that the farther the reference sound source direction becomes from the target sound source direction d, the smaller the degree of contribution thereof becomes. Thereafter, the process flow moves to step S304.

(Step S304) The second transfer function calculating unit 109 calculates a transfer function $A_{m[T]}(\omega)$ by interpolating the first transfer functions $A_{[d1][n]}(\omega)$ and $A_{[d2][n]}(\omega)$ indicated by the read first transfer function information using the TDLI method. The second transfer function calculating unit 109 uses Expression (12) to calculate the transfer function $A_{m[T]}(\omega)$.

$$A_{m[T]}(\omega) = A_{[d1][n]}^{\delta_1}(\omega) \cdot A_{[d2][n]}^{\delta_2}(\omega) \qquad (12)$$

That is, the transfer function $A_{m[T]}$ is a geometric mean using the reciprocal of an internal division ratio of the first transfer functions $A_{[d1][n]}(\omega)$ and $A_{[d2][n]}(\omega)$ corresponding to two reference sound source directions $d_1$ and $d_2$ by the target sound source direction d as a weighting coefficient. Thereafter, the process flow moves to step S305.

(Step S305) The second transfer function calculating unit 109 decomposes the calculated transfer function $A_{m[F]}(\omega)$ into the absolute value $\lambda_{m[F]}$ and the phase $t_{m[F]}$ and decomposes the calculated transfer function $A_{m[T]}(\omega)$ into the amplitude (absolute value) $\lambda_{m[T]}$ and the phase $t_{m[T]}$. The transfer function $A_{m[F]}(\omega)$, the amplitude $\lambda_{m[F]}$, and the phase $t_{m[F]}$ have the relationship expressed by Expression (13).

$$A_{m[F]}(\omega)=\lambda_{m[F]}\exp(-j\omega t_{m[F]}) \qquad (13)$$

The transfer function $A_{m[T]}(\omega)$, the amplitude $\lambda_{m[T]}$, and the phase $t_{m[T]}$ have the relationship expressed by Expression (14).

$$A_{m[T]}(\omega)=\lambda_{m[T]}\exp(-j\omega t_{m[T]}) \qquad (14)$$

Thereafter, the process flow moves to step S306.

(Step S306) The second transfer function calculating unit 109 calculates the second transfer function $A_{[d][n]}(\omega)$ corresponding to the target sound source direction by multiplying the amplitude $X_{m[T]}$ based on the TDLI method by the phase $t_{m[F]}$ as expressed by Expression (15).

$$A_{[d][n]}(\omega)=\lambda_{m[T]}\exp(-j\omega t_{m[F]}) \qquad (15)$$

Thereafter, the process flow illustrated in FIG. 8 ends. The magnitude of the amplitude of the target sound source direction based on the TDLI method is between the magnitudes of the amplitude of the two reference sound source directions. On the contrary, it cannot be said that the value of the phase of the target sound source direction based on the TDLI method is between the values of the phases of two reference sound source directions. On the other hand, it cannot be said that the magnitude of the amplitude of the target sound source direction based on the FDLI method is between the magnitudes of the amplitude of the two reference sound source directions. On the contrary, the value of the phase of the target sound source direction based on the FDLI method is between the values of the phases of two reference sound source directions. In the FDLI method, the second transfer function is constructed with the amplitude based on the TDLI method and the phase based on the FDLI method. The magnitude of the amplitude and the value of the phase of the constructed second transfer function are between the two reference sound source directions.

Accordingly, it is possible to improve the interpolation characteristics by using the FTDLI method.

Since the sound source direction stored in the transfer function storage unit 108 are irregular as described above, the distribution of the sound source directions may be inclined to a range in which the distribution of the sound source directions is narrow. Accordingly, the second transfer function calculating unit 109 may perform the process of interpolating the second transfer function only when the sound source direction information and the first transfer function information in at least one sound source direction are stored for each of the divided areas of $360°/M_d°$ which are obtained by equally dividing one circumference angle) ($360°$ by a predetermined division number $M_d$. The division number $M_d$ is three or more and preferably equal to or greater than six. Accordingly, the second transfer function calculating unit 109 can determine that the sound source directions as the candidates of the reference sound source direction in the transfer function storage unit 108 are equally distributed in all directions. Since the second transfer function calculating unit 109 performs the process of interpolating the second transfer function after performing the determination, it is possible to guarantee the accuracy of the calculated second transfer function.

When a reference sound source direction $d_2$ greater than the target sound source direction d is not found in step S301, the second transfer function calculating unit 109 may perform a process of specifying the reference sound source direction $d_2$ from the sound source directions obtained by adding one circumference angle ($360°$) to the sound source directions obtained with reference to the transfer function storage unit 108. When a reference sound source direction $d_1$ smaller than the target sound source direction d is not found, the second transfer function calculating unit 109 may perform a process of specifying the reference sound source direction $d_1$ from the sound source directions obtained by subtracting one circumference angle ($360°$) from the sound source directions obtained with reference to the transfer function storage unit 108.

In step S303, the second transfer function calculating unit 109 calculates the interpolation coefficients $\delta_2$ and $\delta_1$ on the basis of the specified reference sound source direction $d_2$ or reference sound source direction $d_1$.

Accordingly, even when two reference sound source directions interposing the target sound source direction d therebetween is $0°$ (there is a phase variation of $360°$), it is possible to determine an appropriate reference sound source direction.

Sound Processing

The sound processing according to this embodiment will be described below.

Figure 10:
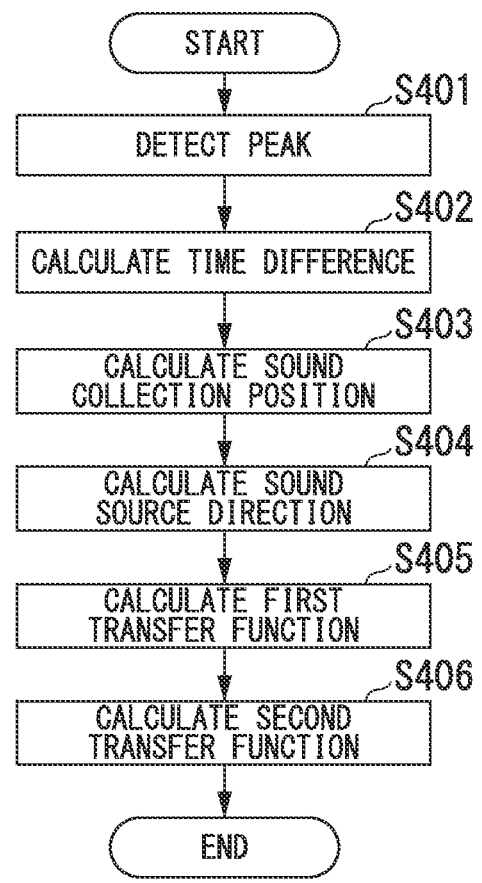
FIG. 10 is a flowchart illustrating sound processing according to the first embodiment of the present invention.

FIG. 10 is a flowchart illustrating the sound processing according to this embodiment.

(Step S401) The peak detecting unit 103 detects a peak of the signal value indicated by the sound signal of one channel input from the signal input unit and extracts the sound signal within a predetermined time from the sampling timing at which the peak is detected for each channel. Thereafter, the process flow moves to step S402.

(Step S402) The time difference calculating unit 104 calculates the time difference for each channel pair of the extracted sound signals of N+1 channels and generates the time difference information indicating the calculated time difference for each channel pair. Thereafter, the process flow moves to step S403.

(Step S403) The sound collection position calculating unit 105 calculates the sound collection position on the basis of the time difference information. Thereafter, the process flow moves to step S404.

(Step S404) The sound source direction calculating unit 106 calculates the sound source direction on the basis of the time difference information and the sound collection position indicated by the sound source state information obtained in the course of calculating the sound collection position in the sound collection position calculating unit 105. Thereafter, the process flow moves to step S405.

(Step S405) The first transfer function calculating unit 107 calculates the first transfer function $A_{[d][n]}$ of each target channel on the basis of the sound signals of the target channels and the sound signal of the representative channel, and stores the sound source direction information indicating the sound source direction and the first transfer function information indicating the calculated first transfer function $A_{[d][n]}$ in the transfer function storage unit 108 in correlation with each other. Thereafter, the process flow moves to step S406.

(Step S406) The second transfer function calculating unit 109 specifies two reference sound source directions interposing the target sound source direction therebetween and reads the first transfer function information corresponding to the specified two reference sound source directions from the transfer function storage unit 108. The second transfer function calculating unit 109 calculates the second transfer function by interpolating the first transfer function indicated by the read first transfer function information using the reciprocal of an internal division ratio at which the gap between the reference sound source directions is divided by the target sound source direction.

The second transfer function calculating unit 109 interpolates the first transfer functions corresponding to the sound source direction information on the basis of the sound source directions indicated by the sound source direction information and the target sound source direction with reference to the first transfer function data stored in the transfer function storage unit 108. The second transfer function corresponding to the target sound source direction is calculated by the interpolation. Thereafter, the process flow illustrated in FIG. 10 ends.

As described above, the sound processing apparatus 10 according to this embodiment includes the sound collection position calculating unit 105 that calculates sound collection positions of sound signals of multiple channels on the basis of the sound signals and the sound source direction calculating unit 106 that calculates the sound source directions on the basis of the sound signals of multiple channels. The sound processing apparatus 10 includes the first transfer function calculating unit 107 that calculates the first transfer functions corresponding to the sound source directions on the basis of the sound signals of multiple channels and the second transfer function calculating unit 109 that calculates the second transfer function by interpolating the first transfer functions corresponding to the sound source directions.

According to this configuration, a set of the sound source direction and the first transfer function is acquired on the basis of the collected sound signals and the second transfer function in the desired sound source direction is calculated with reference to the first transfer function in the acquired sound source direction. Accordingly, it is possible to calculate the transfer functions in a desired direction depending on a room environment without using a measuring sound source.

The sound processing apparatus 10 according to this embodiment includes the time difference calculating unit 104 that calculates the inter-channel time difference of the sound signals. In the sound processing apparatus 10, the sound collection position calculating unit 105 includes the state predicting unit 1052 that predicts the current sound source state information from the previous sound source state information as the sound source state information including the sound collection positions and the state updating unit 1051 that updates the current sound source state information so as to reduce a difference between the time difference calculated by the time difference calculating unit 104 and the time difference based on the current sound source state information.

According to this configuration, since the sound collection positions can be sequentially calculated on the basis of the collected sound signals, it is possible to acquire the sound collection positions at that timing without using another measuring unit.

In the sound processing apparatus 10 according to this embodiment, the time difference calculating unit 104 calculates the inter-channel time difference of the sound signals in which the sound collection positions are disposed within a predetermined range.

According to this configuration, since the time difference between the neighboring sound collection positions is calculated, the variation in the calculated time difference is suppressed. Accordingly, the sound collection position calculating unit can stably estimate the sound source state information that is performed on the basis of the calculated time difference and thus can calculate the sound collection positions with high accuracy.

In the sound processing apparatus 10 according to this embodiment, the sound source direction calculating unit 106 includes the state predicting unit 1062 that predicts the current sound source state information from the previous sound source state information as the sound source state information including the sound source position and the state updating unit 1061 that updates the current sound source state information so as to reduce the difference between the time difference calculated by the time difference calculating unit 104 and the time difference based on the current sound source state information.

According to this configuration, since the sound source directions can be sequentially calculated on the basis of the collected sound signals, it is possible to acquire the sound source direction at that timing without using another measuring unit.

Second Embodiment

A second embodiment of the present invention will be described below with reference to the accompanying drawings. The same elements as in the aforementioned embodiment will be referenced by the same reference numerals and a description thereof will not be repeated.

Figure 11:
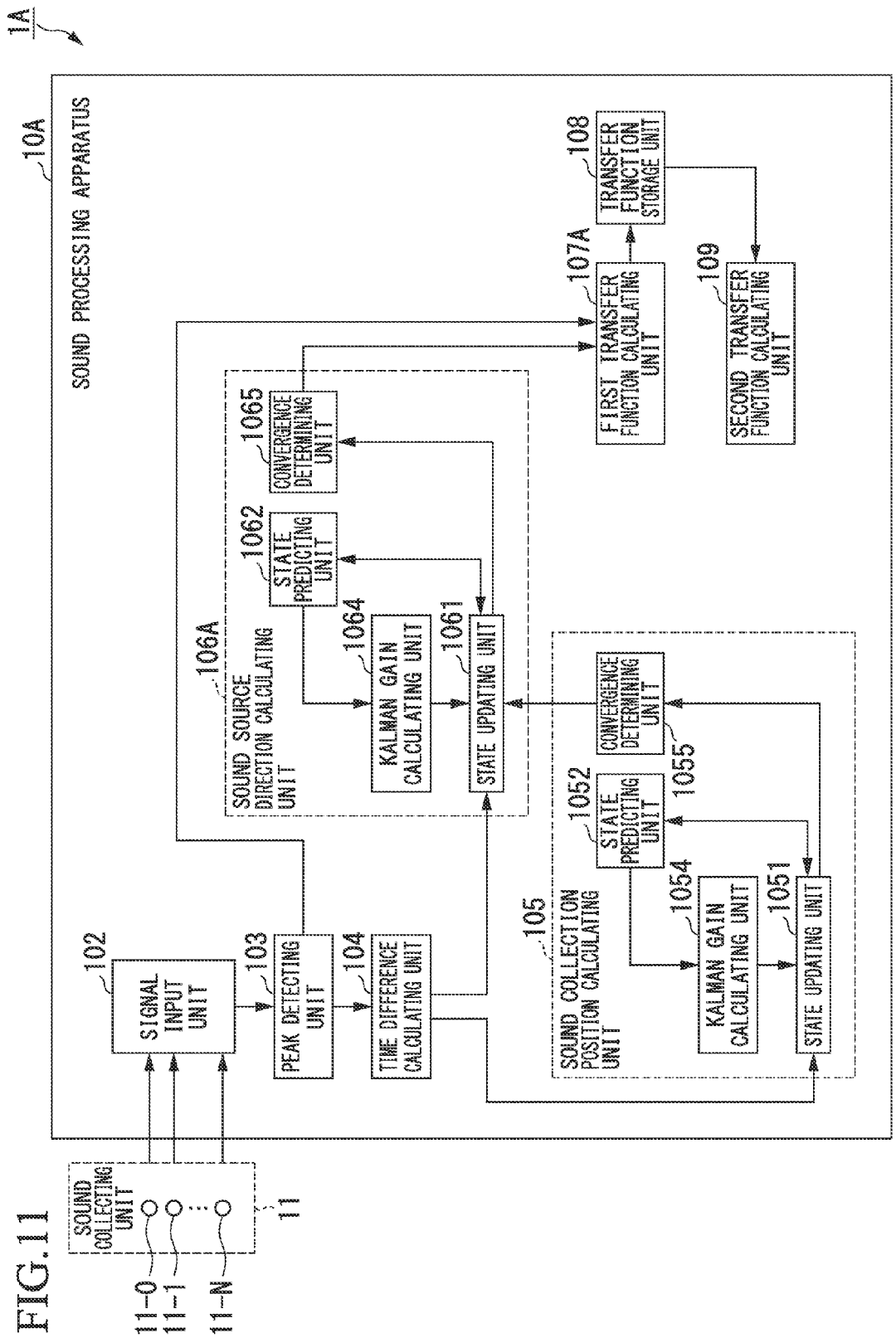
FIG. 11 is a block diagram schematically illustrating a configuration of a sound processing system according to a second embodiment of the present invention.

FIG. 11 is a block diagram schematically illustrating a configuration of a sound processing system 1A according to this embodiment.

The sound processing system 1A includes a sound collecting unit 11 and a sound processing apparatus 10A.

The sound processing apparatus 10A includes a signal input unit 102, a peak detecting unit 103, a time difference calculating unit 104, a sound collection position calculating unit 105, a sound source direction calculating unit 106A, a first transfer function calculating unit 107A, a transfer function storage unit 108, and a second transfer function calculating unit 109.

That is, the sound processing apparatus 10A includes the sound source direction calculating unit 106A and the first transfer function calculating unit 107A instead of the sound source direction calculating unit 106 (FIG. 1) and the first transfer function calculating unit 107 (FIG. 1) in the sound processing apparatus 10 (FIG. 1).

The sound source direction calculating unit 106A has the same configuration as the sound source direction calculating unit 106 and performs the same process. Time difference information on the sound signal at a timing which is delayed by at least a delay time $T_A$ from the time difference information input to the sound collection position calculating unit 105 is input to the sound source direction calculating unit 106A. The delay time $T_A$ is a predetermined time longer than a convergence time of an estimation error of sound source state information $\xi_k$ calculated by the sound collection position calculating unit 105. The "timing which is delayed by at least the delay time $T_A$" means a timing after the delay time $T_A$ passes from a certain timing or a timing further delayed from the timing. This is because it cannot be said that the peak detecting unit 103 detects a subsequent peak after the delay time $T_A$ from the timing at which one peak is detected. The sound source direction calculating unit 106A calculates the sound source direction d by using this time difference information instead of the same time difference information as the time difference information input to the sound collection position calculating unit 105. The sound source direction calculating unit 106A outputs the sound source direction information indicating the calculated sound source direction d to the first transfer function calculating unit 107A.

The first transfer function calculating unit 107A has the same configuration as the first transfer function calculating unit 107 and performs the same process. The sound source signals input to the first transfer function calculating unit 107A are the sound signals of N+1 channels associated with the time difference information input to the sound source direction calculating unit 106A and are the sound signals at the timing delayed by at least the delay time $T_A$ from the sound signals associated with the time difference information input to the sound collection position calculating unit 105. The first transfer function calculating unit 107A calculates the first transfer function $A_{[d][n]}$ for each target channel on the basis of the input sound signals.

The first transfer function calculating unit 107A stores the sound source direction information input from the sound source direction calculating unit 106A and the first transfer function information indicating the calculated first transfer function $A_{[d][n]}$ in the transfer function storage unit 108 in correlation with each other.

Sound Processing

The sound processing according to this embodiment will be described below.

Figure 12:
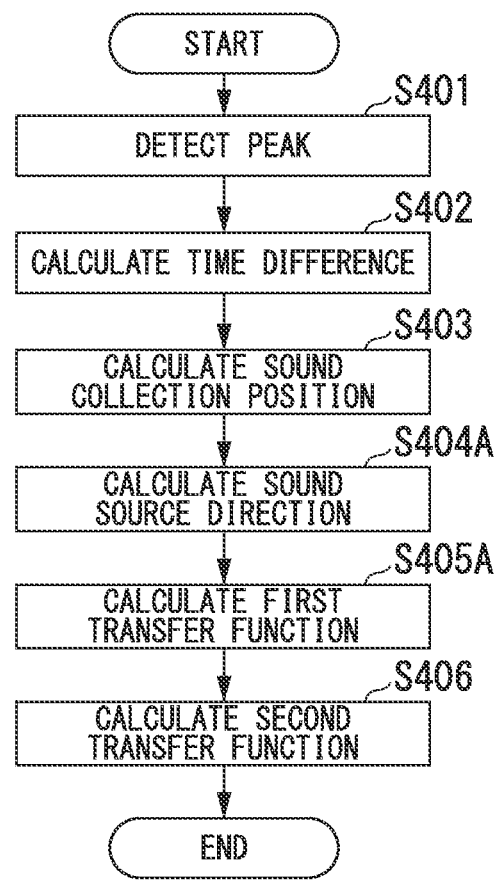
FIG. 12 is a flowchart illustrating sound processing according to the second embodiment of the present invention.

FIG. 12 is a flowchart illustrating the sound processing according to this embodiment.

The sound processing illustrated in FIG. 12 includes steps S401 to S403, S404A, S405A, and S406. Accordingly, the sound processing apparatus 10A performs step S404A after performing steps S401 to S403.

(Step S404A) The time difference information associated with the sound signals at the timing delayed by at least the delay time $T_A$ from the sound signals associated with the time difference information input to the sound collection position calculating unit 105 is input to the sound source direction calculating unit 106A. The sound source direction calculating unit 106A calculates the sound source direction on the basis of the time difference information and the sound collection positions indicated by the sound source state information obtained in the course of calculating the sound collection positions in the sound collection position calculating unit 105. Thereafter, the process flow moves to step S405A.

(Step S405A) The sound source signals delayed by at least the delay time $T_A$ from the sound signals associated with the time difference information input to the sound collection position calculating unit 105 is input to the first transfer function calculating unit 107A. The first transfer function calculating unit 107A calculates the first transfer function $A_{[d][n]}$ for each target channel and stores the sound source direction information indicating the sound source direction and the first transfer function information indicating the calculated first transfer function $A_{[d][n]}$ in the transfer function storage unit 108 in correlation with each other. Thereafter, the process flow moves to step S406.

As described above, in the sound processing apparatus 10A according to this embodiment, the time difference information at the timing delayed by at least a predetermined delay time (for example, $T_A$) from the time difference information input to the sound collection position calculating unit 105 is input to the sound source direction calculating unit 106A, and the time difference information at a timing delayed by at least the delay time from the sound signals associated with the time difference information input to the sound collection position calculating unit 105 is input to the first transfer function calculating unit 107A.

According to this configuration, the process performed by the sound collection position calculating unit 105 and the processes performed by the sound source direction calculating unit 106A and the first transfer function calculating unit 107A can be performed in parallel. Accordingly, since the delay time until the estimation error of the sound source state information in the sound collection position calculating unit 105 converges does not affect the sound source direction calculating unit 106A and the first transfer function calculating unit 107A, it is possible to rapidly obtain the sound source direction and the first transfer function.

Third Embodiment

A third embodiment of the present invention will be described below with reference to the accompanying drawings. The same elements as in the aforementioned embodiment will be referenced by the same reference numerals and a description thereof will not be repeated.

Figure 13:
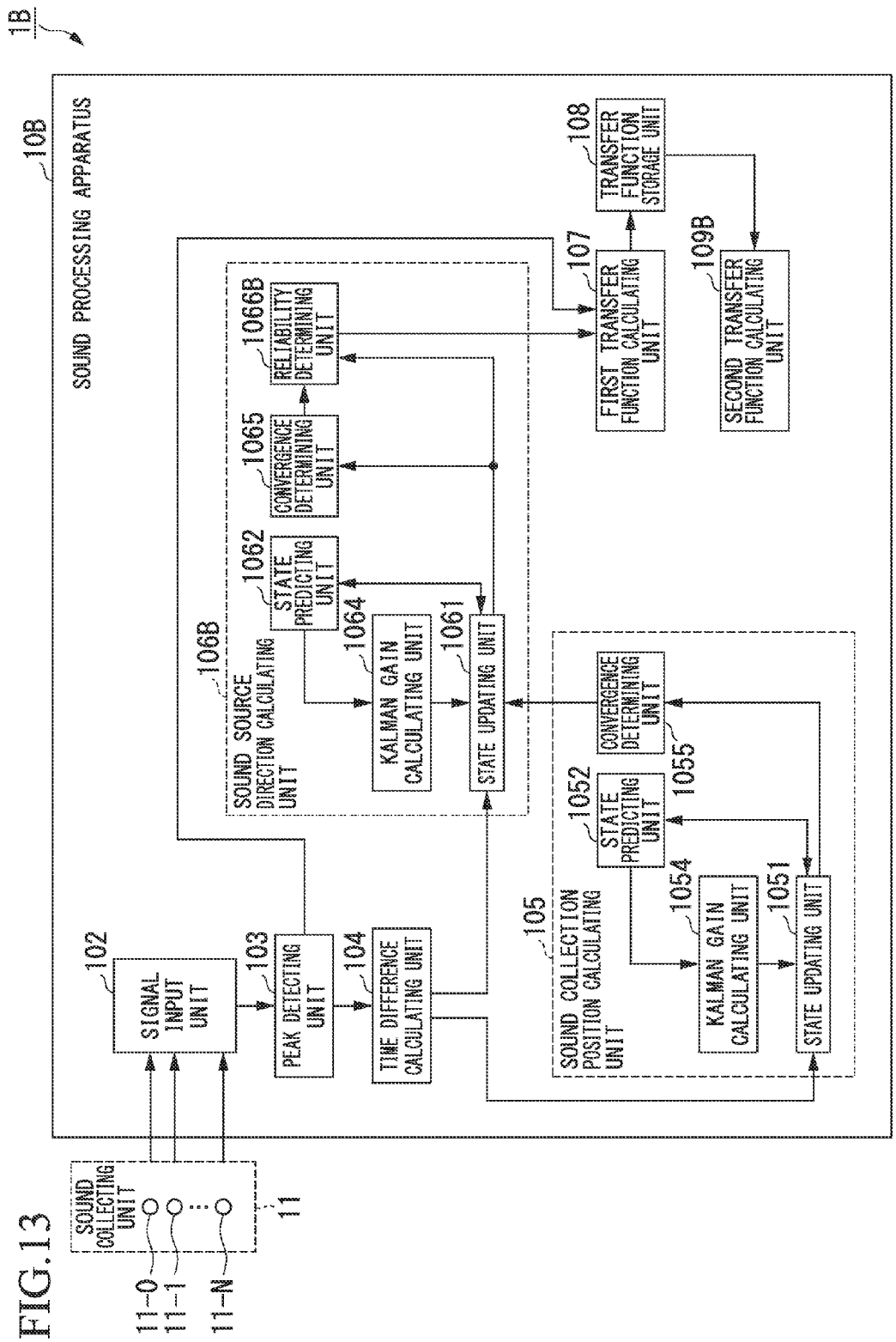
FIG. 13 is a block diagram schematically illustrating a configuration of a sound processing system according to a third embodiment of the present invention.

FIG. 13 is a block diagram schematically illustrating a configuration of a sound processing system 1B according to this embodiment.

The sound processing system 1B includes a sound collecting unit 11 and a sound processing apparatus 10B.

The sound processing apparatus 10B includes a signal input unit 102, a peak detecting unit 103, a time difference calculating unit 104, a sound collection position calculating unit 105, a sound source direction calculating unit 106B, a first transfer function calculating unit 107A, a transfer function storage unit 108, and a second transfer function calculating unit 109B.

That is, the sound processing apparatus 10B includes the sound source direction calculating unit 106B and the second transfer function calculating unit 109B instead of the sound source direction calculating unit 106 (FIG. 1) and the second transfer function calculating unit 109 (FIG. 1) in the sound processing apparatus 10 (FIG. 1).

The sound source direction calculating unit 106B further includes a reliability determining unit 1066B in addition to the configuration of the sound source direction calculating unit 106.

A predictive residual $(\zeta_k - \zeta_{k|k-1})$ of an observed value vector at the current timing k is input to the reliability determining unit 1066B from the state updating unit 1061 when the sound source direction information is input from the convergence determining unit 1065, and the absolute value $|\zeta_k - \zeta_{k|k-1}|$ of the input predictive residual is defined as reliability w. The reliability w represents that the greater the value becomes, the lower the reliability of the sound source direction d calculated by the sound source direction calculating unit 106B becomes and that the smaller the value becomes, the higher the reliability of the sound source direction d becomes.

The reliability determining unit 1066B outputs the input sound source direction information and reliability information indicating the reliability w to the first transfer function calculating unit 107 in correlation with each other when the reliability w is less than a predetermined reliability threshold value $w_{th}$. The reliability determining unit 1066B does not output but dismisses the input sound source direction information and the reliability information indicating the reliability w when the reliability w is equal to or greater than the predetermined reliability threshold value $w_{th}$. Accordingly, the sound source direction information, the reliability information, and the first transfer function information are stored in the transfer function storage unit 108 in correlation with each other and first transfer function data is formed.

An amount of sound source state information 4 updated at the current timing k, that is, $K_k(\zeta_k - \zeta_{k|k-1})$, may be input to the reliability determining unit 1066B and the absolute value of the input amount of sound source state information updated may be determined to be the reliability w.

Example of First Transfer Function Data

An example of the first transfer function data stored in the transfer function storage unit 108 will be described below.

FIG. 14 is a diagram illustrating an example of the first transfer function data according to this embodiment.

In the example illustrated in FIG. 14, the sound source direction d indicated by the sound source direction information, the reliability w indicated by the reliability information, and the transfer functions $A_{[d][1]}(\omega)$, $A_{[d][2]}(\omega)$, ..., $A_{[d][7]}(\omega)$ of channels 1 to 7 indicated by the first transfer function information are correlated with each other.

For example, the sound source direction 13° illustrated in the second row of FIG. 14 is correlated with the reliability 0.186, the transfer function 0.24+0.35j of channel 1, the transfer function 0.44−0.08j of channel 2, the transfer function 0.40+0.29j of channel 3, the transfer function 0.18+0.51j of channel 4, the transfer function −0.37+0.32j of channel 5, the transfer function of −0.14+0.48j of channel 6, and the transfer function 0.15+0.29j of channel 7.

The transfer functions of the channels are actually given for L/2 frequencies ω in each sound source direction d. Only one frequency of the L/2 frequencies is illustrated in FIG. 14.

Referring to FIG. 13 again, the second transfer function calculating unit 109B determines weighting coefficients based on the reliabilities corresponding to two pieces of reference sound source direction information and determines interpolation coefficients by multiplying the determined weighting coefficients by the reciprocal of the internal division ratio at which two reference sound source directions are internally divided by the target sound source direction. The second transfer function calculating unit 109B calculates the second transfer functions by interpolating the first transfer functions corresponding to two pieces of reference sound source direction information on the basis of the determined interpolation coefficients.

Specifically, the second transfer function calculating unit 109B specifies the reference sound source directions on the basis of the target sound source direction d (step S301 in FIG. 8) and then reads the first transfer function information corresponding to the specified reference sound source direction information and the reliability information from the transfer function storage unit 108. The second transfer function calculating unit 109B determines the weighting coefficients $v_1$ and $v_2$ on the basis of the reliabilities $w_1$ and $w_2$ indicated by the read two pieces of reliability information. The reliabilities $w_1$ and $w_2$ are reliabilities corresponding to the reference sound source directions $d_1$ and $d_2$. The weighting coefficients $v_1$ and $v_2$ are positive real numbers which decreases as the absolute values of the reliabilities $w_1$ and $w_2$ increases and which increases as the absolute values of the reliabilities $w_1$ and $w_2$ decreases. The weighting coefficients $v_1$ and $v_2$ can be determined, for example, as expressed by Expression (16).

$$v_1 = \frac{1}{|w_1| + \varepsilon} \quad v_2 = \frac{1}{|w_2| + \varepsilon} \tag{16}$$

In Expression (16), ε is a predetermined positive real number which prevents division by zero.

The second transfer function calculating unit 109B calculates the multiplied values $D_1$ and $D_2$ by multiplying the determined weighting coefficients $v_1$ and $v_2$ by the reciprocals $|(d_2-d_1)/(d-d_1)|$ and $|(d_2-d_1)/(d_2-d)|$ of the internal division ratios at which two reference sound source directions are internally divided by the target sound source direction d, respectively, as expressed by Expression (17).

$$D_1 = \frac{1}{|w_1| + \varepsilon} \cdot \left| \frac{d_2 - d_1}{d - d_1} \right| \quad D_2 = \frac{1}{|w_2| + \varepsilon} \cdot \left| \frac{d_2 - d_1}{d_2 - d} \right| \tag{17}$$

The second transfer function calculating unit 109B determines the interpolation coefficients $\delta_2$ and $\delta_1$ by dividing the multiplied values $D_1$ and $D_2$ by the total sum $D_1+D_2$ thereof for normalization, respectively, as expressed by Expression (18).

$$\delta_1 = \frac{D_1}{D_1 + D_2} \quad \delta_2 = \frac{D_2}{D_1 + D_2} \tag{18}$$

That is, the interpolation coefficients $\delta_1$ and $\delta_2$ have larger values as the reliabilities w of the reference sound source directions $d_1$ and $d_2$ decreases. The interpolation coefficients $\delta_1$ and $\delta_2$ have larger values as the reference sound source directions $d_1$ and $d_2$ become closer to the target sound source direction d.

The second transfer function calculating unit 109B calculates the second transfer function $A_{[d][n]}(\omega)$ by interpolating the first transfer functions $A_{[d1][n]}(\omega)$ and $A_{[d2][n]}(\omega)$ corresponding to the reference sound source directions $d_1$ and $d_2$ using the determined interpolation coefficients $\delta_1$ and $\delta_2$. At the time of calculating the second transfer function $A_{[d][n]}(\omega)$, the second transfer function calculating unit 109B performs the processes of steps S303 to S306 (FIG. 8).

Sound Processing

The sound processing according to this embodiment will be described below.

Figure 15:
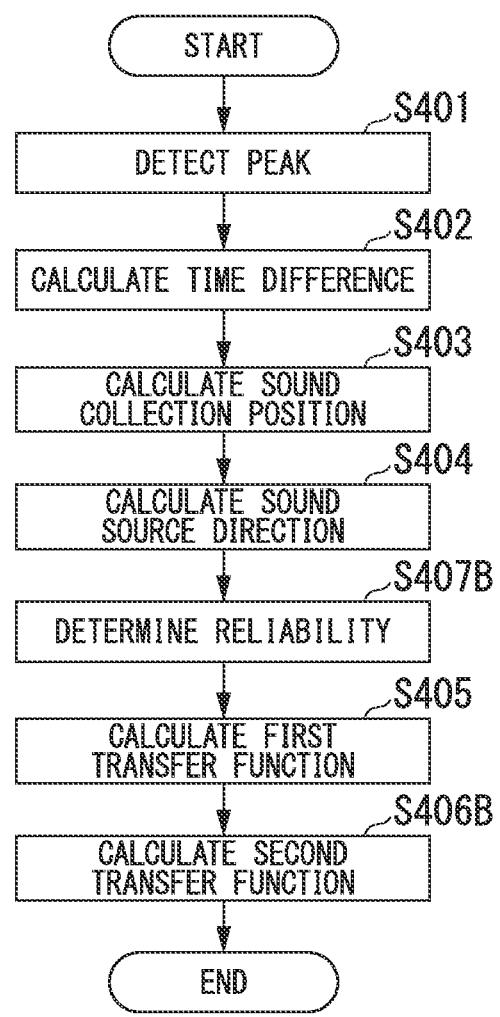
FIG. 15 is a flowchart illustrating sound processing according to the third embodiment of the present invention.

FIG. 15 is a flowchart illustrating the sound processing according to this embodiment.

The sound processing illustrated in FIG. 15 includes steps S401 to S404, S407B, S405, and S406B. Accordingly, the sound processing apparatus 10B performs step S407B after performing steps S401 to S404.

(Step S407B) The reliability determining unit 1066B determines the reliability w on the basis of the predictive residual $(\zeta_k - \zeta_{k|k-1})$ and determines whether the determined reliability w is less than the predetermined reliability threshold value $w_{th}$. The reliability determining unit 1066B outputs the input sound source direction information and the reliability information indicating the reliability w to the first transfer function calculating unit 107 in correlation with each other when the determined reliability w is less than the threshold value $w_{th}$ (the reliability in the sound source direction d is high). Thereafter, the process flow moves to step S405. The sound processing apparatus 10B moves the process flow to step S406B after step S405 is finished.

(Step S406B) the second transfer function calculating unit 109B specifies two reference sound source directions interposing the target sound source direction therebetween and reads the first transfer function information and the reliability information corresponding to the specified two reference sound source directions from the transfer function storage unit 108. The second transfer function calculating unit 109B determines the weighting coefficients $v_1$ and $v_2$ based on the reliabilities corresponding to two pieces of reference sound source direction information and determines the interpolation coefficients $\delta_1$ and $\delta_2$ by normalizing the multiplied values $D_1$ and $D_2$, which is obtained by multiplying the determined weighting coefficients by the reciprocal of the internal division ratio at which two reference sound source directions are internally divided by the target sound source direction. The second transfer function calculating unit 109B calculates the second transfer functions by interpolating the first transfer functions indicated by the read first transfer function information with the interpolation coefficients, respectively. Thereafter, the process flow illustrated in FIG. 15 ends.

As described above, in the sound processing apparatus 10B according to this embodiment, the second transfer function calculating unit 109B interpolates the first transfer functions calculated by the first transfer function calculating unit 107 by the weighting based on the amount of sound source state information updated by the state updating unit 1061.

According to this configuration, the second transfer functions are calculated by interpolating the first transfer functions in the sound source direction using the weight based on the amount of sound source state information used to calculate the sound source direction. Since the reliability of the sound source direction calculated by the sound source direction calculating unit 106B depends on the amount of sound source state information updated, the reliability of the calculated second transfer function is improved.

Fourth Embodiment

A fourth embodiment of the present invention will be described below with reference to the accompanying drawings. The same elements as in the aforementioned embodiment will be referenced by the same reference numerals and a description thereof will not be repeated.

Figure 16:
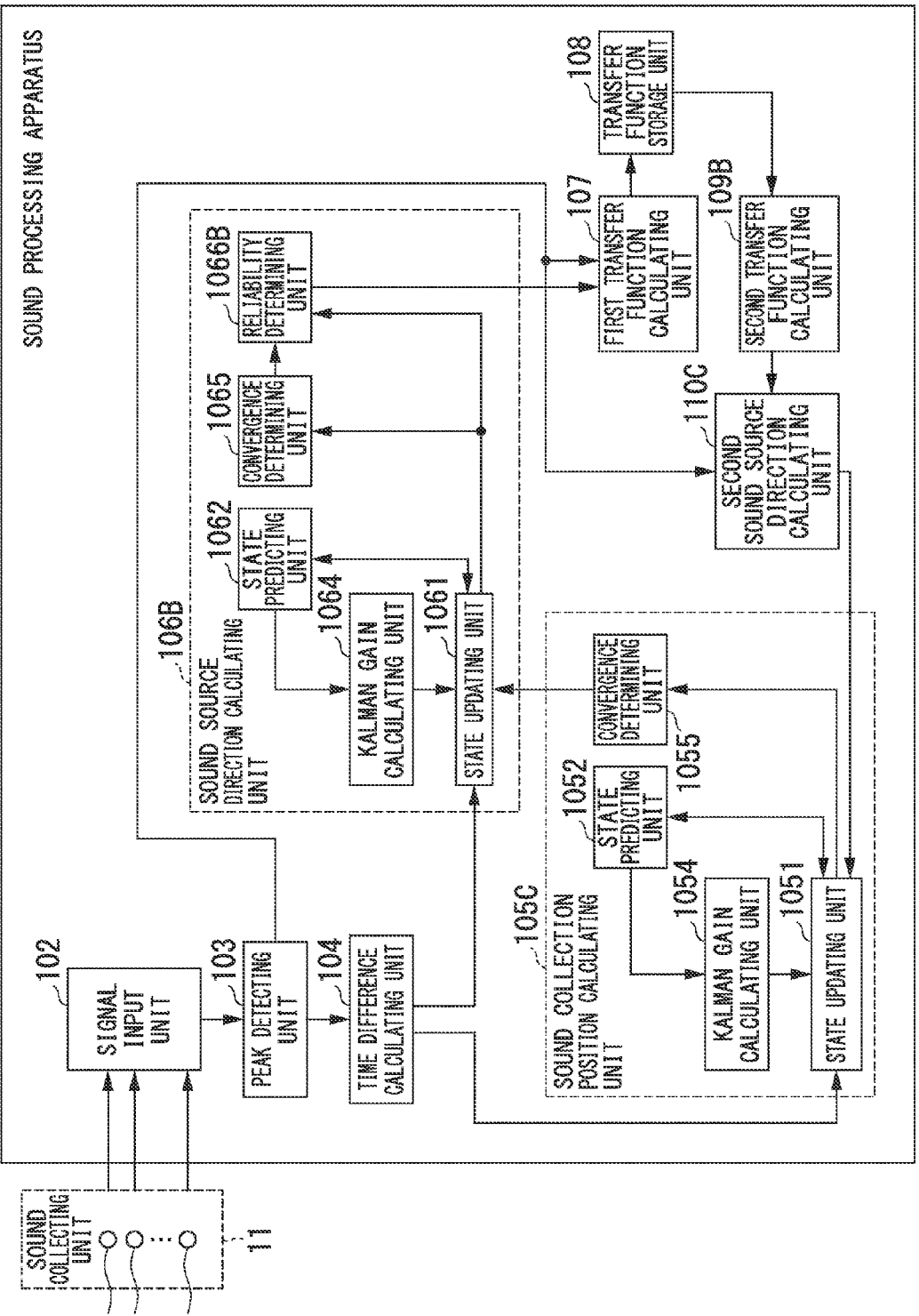
FIG. 16 is a block diagram schematically illustrating a configuration of a sound processing system according to a fourth embodiment of the present invention.

FIG. 16 is a block diagram schematically illustrating a configuration of a sound processing system 1C according to this embodiment.

The sound processing system 1C includes a sound collecting unit 11 and a sound processing apparatus 10C.

The sound processing apparatus 10C includes a signal input unit 102, a peak detecting unit 103, a time difference calculating unit 104, a sound collection position calculating unit 105C, a sound source direction calculating unit 106B, a first transfer function calculating unit 107, a transfer function storage unit 108, a second transfer function calculating unit 109B, and a second sound source direction calculating unit 110C.

That is, the sound processing apparatus 10C includes the sound collection position calculating unit 105C instead of the sound collection position calculating unit 105 in the sound processing apparatus 10B (FIG. 13) and further includes the second sound source direction calculating unit 110C. In the following description, the sound source direction calculating unit 106B may be referred to as a first sound source direction calculating unit so as to be distinguished from the second sound source direction calculating unit 110C.

The second sound source direction calculating unit 110C calculates a second sound source direction d' on the basis of second transfer function information input from the second transfer function calculating unit 109B and sound signals of N+1 channels input from the peak detecting unit 103.

The second sound source direction calculating unit 110C calculates the second sound source direction d', for example, using a multiple signal classification (MUSIC) method. Specifically, the second sound source direction calculating unit 110C receives the second transfer functions for each sound source directions d distributed at predetermined intervals (for example, 1°) for each channel and generates a transfer function vector D(d) having the second transfer functions $A_{[d][n]}(\omega)$ of the channels n as elements for each sound source direction d.

Here, the second sound source direction calculating unit 110C transforms the sound signals $x_n$ of the channels n to the frequency domain for each frame including a predetermined number of samples, calculates transformation coefficients $X_n(\omega)$, and calculates an input correlation matrix $R_{xx}$ from the calculated transformation coefficients as expressed by Expression (19).

$$R_{xx}=E[[X][X]^*] \quad (19)$$

In Expression (19), E[ . . . ] represents the expected value of . . . [X] is an (N+1)-dimensional vector having the transformation coefficients of the channels as elements. [ . . . ]* represents the conjugate of a matrix or a vector.

Then, the second sound source direction calculating unit 110C calculates eigenvalues $\delta_i$ and eigenvectors $e_i$ of the input correlation matrix $R_{xx}$. The input correlation matrix $R_{xx}$, the eigenvalues $\delta_i$, and the eigenvectors $e_i$ have the relationship expressed by Expression (20).

$$R_{xx}e_i=\delta_i e_i \quad (20)$$

In Expression (20), i is an integer equal to or greater than 1 and equal to or less than N+1. The indices i are arranged in a descending order of the eigenvalues $\delta_i$.

The second sound source direction calculating unit 110C calculates a spatial spectrum $P_{sp}(d)$ expressed by Expression (21) on the basis of the transfer function vector D(d) and the calculated eigenvectors $e_i$.

$$P_{sp}(d) = \frac{|D^*(d)D(d)|}{\sum_{i=K+1}^{N+1}|D^*(d)e_i|} \quad (21)$$

In Expression (21), K represents the number of sound sources detectable (for example, 1) and is a predetermined natural number less than N.

The second sound source direction calculating unit 110C calculates the total sum of the spatial spectrums $P_{sp}(d)$ in the frequency bands in which the S/N ratio is greater than a predetermined threshold value (for example, 20 dB) as an extended spatial spectrum $P_{ext}(d)$. The second sound source direction calculating unit 110C determines the direction d in which the calculated extended spatial spectrum $P_{ext}(d)$ has a local maximum value as the second sound source direction d'. The second sound source direction d' is a sound source direction calculated on the basis of the sound signals of N+1 channels. The second sound source direction calculating unit 110C outputs second sound source direction information indicating the determined second sound source direction d' to the sound collection position calculating unit 105C.

The sound collection position calculating unit 105C includes a state updating unit 1051, a state predicting unit 1052, a Kalman gain calculating unit 1054, and a convergence determining unit 1055, similarly to the sound collection position calculating unit 105.

The sound collection position calculating unit 105C predicts the sound source state information $\xi_{k|k-1}$ and updates the sound source state information $\xi_k$ on the basis of the time difference information input from the time difference calculating unit 104 at a certain timing, similarly to the sound collection position calculating unit 105. Here, the sound collection position calculating unit 105C predicts the sound source state information $\xi_{k|k-1}$ and updates the sound source state information $\xi_k$ on the basis of the second sound source direction information input from the second sound source direction calculating unit 110C at another timing. In other words, the sound collection position calculating unit 105C calculates the sound source state information $\xi_{k|k-1}$ and $\xi_k$ so as to reduce the estimation error of the observed value $\zeta'_{k|k-1}$ using the second sound source direction d' as the observed value $\zeta'_k$.

The second sound source direction d' has the relationship expressed by Expression (22) between the sound source position $(x_k, y_k)$ and the centroid point $(m_{c,x}, m_{c,y})$ of the sound collection positions.

$$d' = \arctan\left(\frac{y_k - m_{c,y}}{x_k - m_{c,x}}\right) \quad (22)$$

In Expression (22), since the centroid point $(m_{c,x}, m_{c,y})$ is the average values of the sound collection positions $(m_{n,x}, m_{n,y})$ over the channels, the observed value $\zeta_{k|k-1}'$ at the current timing k predicted from the previous timing k−1, that is, the predicted value of the second sound source direction d', is calculated from the sound source state information $\xi_{k|k-1}$. Accordingly, the state updating unit 1051, the state predicting unit 1052, and the Kalman gain calculating unit 1054 of the sound collection position calculating unit 105C can calculate the sound source state information $\xi_{k|k-1}$ and $\xi_k$ so as to reduce the estimation error of the observed value $\zeta'_{k|k-1}$ by replacing the observed value vectors $\zeta_{k|k-1}$ and $\zeta_k$ with the observed values $\zeta'_{k|k-1}$ and $\zeta'_k$ at a different timing.

Specifically, at a different timing, the state predicting unit 1052 calculates the second sound source direction d' given by Expression (22) as the observed value $\zeta'_{k|k-1}$ on the basis of the sound source state information $\xi_{k|k-1}$ at the current timing k.

The Kalman gain calculating unit 1054 partially differentiate the observed value $\zeta'_{k|k-1}$ by the elements of the sound source state information $\xi_{k|k-1}$ and calculates the elements of the matrix $H_k$ (Expression (9)).

The state updating unit 1051 adds the observation error $\delta'_k$ to the observed value $\zeta'_k$ and updates the observed value $\zeta'_k$ to the value obtained by the addition. The state updating unit 1051 calculates the sound source state information $\xi_k$ at the current timing k by adding the multiplied value vector, which is obtained by multiplying the predictive residual $(\zeta'_k - \zeta'_{k|k-1})$ of the observed value at the current timing k by the Kalman gain $K_k$, to the predicted sound source state information $\xi_{k|k-1}$ at the current timing k (Expression (3)).

Similarly to the sound collection position calculating unit 105, the sound collection position calculating unit 105C may alternately perform the process (hereinafter, referred to as process on the observed value vector $\zeta_k$) of calculating the sound source state information $\xi_{k|k-1}$ and $\xi_k$ on the basis of the observed value vector $\zeta_k$ and the process (hereinafter, referred to as a process on the observed value $\zeta'_k$) of calculating the sound source state information $\xi_{k|k-1}$ and $\xi_k$ on the basis of the observed value $\zeta'_k$ as described above. Here, the sound collection position calculating unit 105C is not limited to these processes as long as it can perform the process on the observed value vector $\zeta_k$ and the process on the observed value $\zeta'_k$ at different timings. The sound collection position calculating unit 105C may repeat the period of the process on the observed value $\zeta'_k$ N" times after performing the process on the observed value vector $\zeta_k$ N' times. Here, N' and N" are predetermined integers equal to or greater than 1. N' and N" may be equal to or different from each other.

The sound processing according to this embodiment will be described below.

Figure 17:
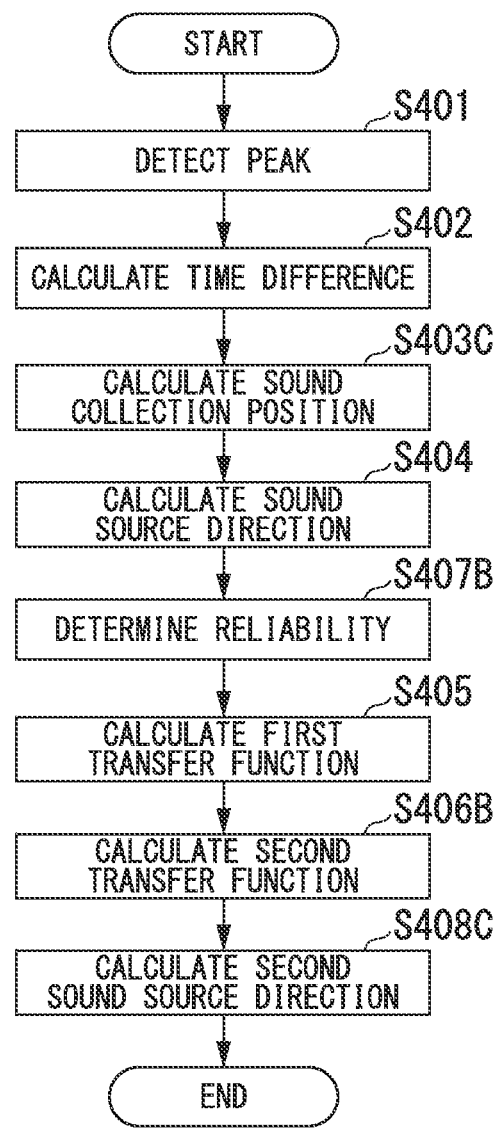
FIG. 17 is a flowchart illustrating sound processing according to the fourth embodiment of the present invention.

FIG. 17 is a flowchart illustrating the sound processing according to this embodiment.

The sound processing illustrated in FIG. 17 includes steps S401, S402, S403C, S404, S407B, S405, S406B, and S408C.

The sound processing apparatus 10C performs step S403C after performing steps S401 and S402.

(Step S403C) The sound collection position calculating unit 105C predicts the sound source state information $\xi_{k|k-1}$ and updates the sound source state information $\xi_k$ using the time difference information as the observed value information at a certain timing (for example, odd sampling timing). The sound collection position calculating unit 105C predicts the sound source state information $\xi_{k|k-1}$ and updates the sound source state information $\xi_k$ using the second sound source direction information as the observed value information at another timing (for example, even sampling timing). By repeating these processes, the sound collection position calculating unit 105C calculates the sound collection positions. Thereafter, the sound processing apparatus 10C performs steps S404, A407B, S405, and S406B. Thereafter, the process flow moves to step S408C.

(Step S408C) The second sound source direction calculating unit 110C calculates the second sound source direction d' on the basis of the second transfer function information input from the second transfer function calculating unit 109B and the sound signals of N+1 channels input from the peak detecting unit 103 and generates the second sound source direction information. Thereafter, the process flow illustrated in FIG. 17 ends.

As described above, the sound processing apparatus 10C according to this embodiment includes the second sound source direction calculating unit 110C that calculates the sound source direction on the basis of the second transfer function calculated by the second transfer function calculating unit 109B and the sound signals of multiple channels. The state updating unit 1061 updates the current sound source state information so as to reduce the difference between the sound source direction calculated by the second sound source direction calculating unit 110C and the sound source direction based on the current sound source state information.

According to this configuration, since the sound source state information is updated on the basis of the sound source direction which is information other than the time difference, it is possible to lower the possibility of a localized solution in comparison with the case in which only one of the time difference and the sound source direction is used. This is because an index value (for example, square error) for evaluating the magnitude of the difference between the sound source direction calculated by the second sound source direction calculating unit 110C and the sound source direction based on the current sound source state information generally has a plurality of local minimum values, but the convergence of the sound source state information on a specified local minimum value is avoided by updating the sound source state information on the basis of other information. Accordingly, it is possible to calculate the sound collection positions indicated by the sound source state information with higher accuracy.

Fifth Embodiment

A fifth embodiment of the present invention will be described below with reference to the accompanying drawings. The same elements as in the aforementioned embodiment will be referenced by the same reference numerals and a description thereof will not be repeated.

Figure 18:
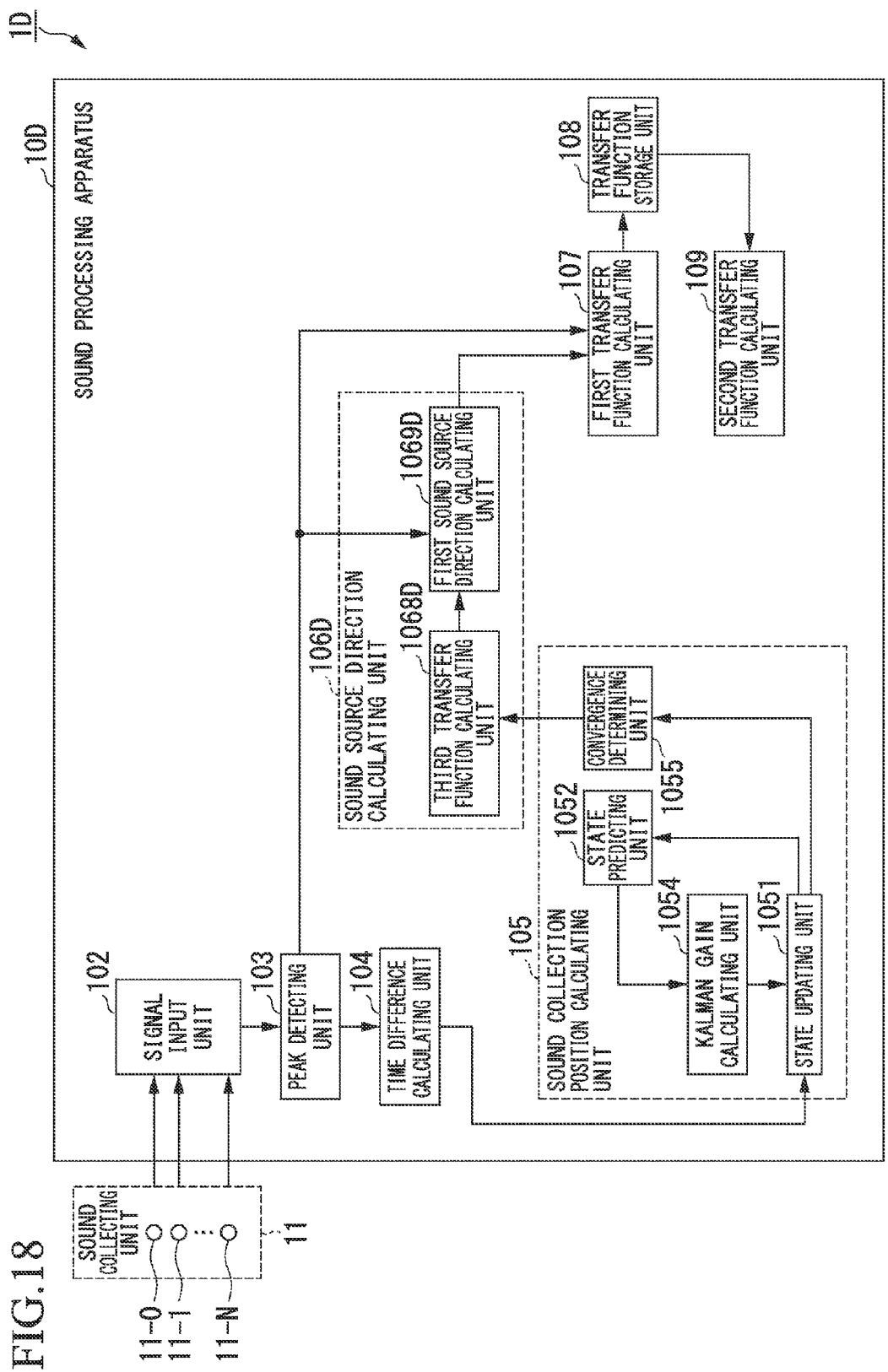
FIG. 18 is a block diagram schematically illustrating a configuration of a sound processing system according to a fifth embodiment of the present invention.

FIG. 18 is a block diagram schematically illustrating a configuration of a sound processing system 1D according to this embodiment.

The sound processing system 1D includes a sound collecting unit 11 and a sound processing apparatus 10D.

The sound processing apparatus 10D includes a signal input unit 102, a peak detecting unit 103, a time difference calculating unit 104, a sound collection position calculating unit 105, a sound source direction calculating unit 106D, a first transfer function calculating unit 107, a transfer function storage unit 108, and a second transfer function calculating unit 109.

That is, the sound processing apparatus 10D includes the sound source direction calculating unit 106D instead of the sound source direction calculating unit 106 in the sound processing apparatus 10 (FIG. 1).

The sound source direction calculating unit 106D includes a third transfer function calculating unit 1068D and a first sound source direction determining unit 1069D.

The sound source state information is input to the third transfer function calculating unit 1068D from the sound collection position calculating unit 105. The third transfer function calculating unit 1068D calculates a third transfer function $A_{[d][n]}(\omega)$ of channel n in each of the sound source direction d which are distributed at predetermined intervals on the basis of a propagation model for giving propagation characteristics from a sound source to a sound collection position. The sound collecting position $(m_{n,x}, m_{n,y})$ of each channel is given to the input sound source state information. The distance from the sound source to the centroid point of the sound collection positions may be determined in advance.

The propagation model is a model that can provide a transfer function indicating the propagation characteristics depending on the sound source direction and the sound collection position. The propagation model is, for example, a plane wave model. The transfer function A(r, d) based on the plane wave model represents a variation in phase due to a delay based on the propagation up to a sound collection position spaced apart by a distance r from a sound source and the amplitude is assumed to be constant. The transfer function A(r, d) based on the plane wave model is given by Expression (23).

$$A(r,d) = \exp(-kr \cos d) \quad (23)$$

In Expression (23), k represents the wavenumber and is equal to $\omega/c$. The third transfer function calculating unit 1068D uses a predetermined value as the distance r.

The third transfer function calculating unit 1068D outputs third transfer function information indicating the third transfer function $A_{[d][n]}(\omega)$ of channel n calculated in reach sound source direction d to the first sound source direction determining unit 1069D.

The third transfer function calculating unit 1068D may calculate the third transfer function $A_{[d][n]}(\omega)$ using a spherical wave model. The transfer function A(r, d) based on the spherical model represents a variation in phase due to a delay based on the propagation up to a sound collection position spaced apart by a distance r from a sound source and a decrease in amplitude in inverse proportion to the distance r. The transfer function A(r, d) based on the spherical wave model is given by Expression (24).

$$A(r, d) = \frac{\exp(-kr \cos d)}{r + r_0} \quad (24)$$

In Expression (24), $r_0$ is a predetermined positive real number. $r_0$ is, for example, the radius of an object (that is, sound source) emitting sound.

The first sound source direction determining unit 1069D calculates the sound source directions on the basis of the third transfer function information input from the third transfer function calculating unit 1068D and the sound signals of N+1 channels input from the peak detecting unit 103.

The first sound source direction determining unit 1069D calculates the sound source direction d using the MUSIC method and outputs sound source direction information indicating the calculated sound source direction d to the first transfer function calculating unit 107.

The sound processing according to this embodiment will be described below.

Figure 19:
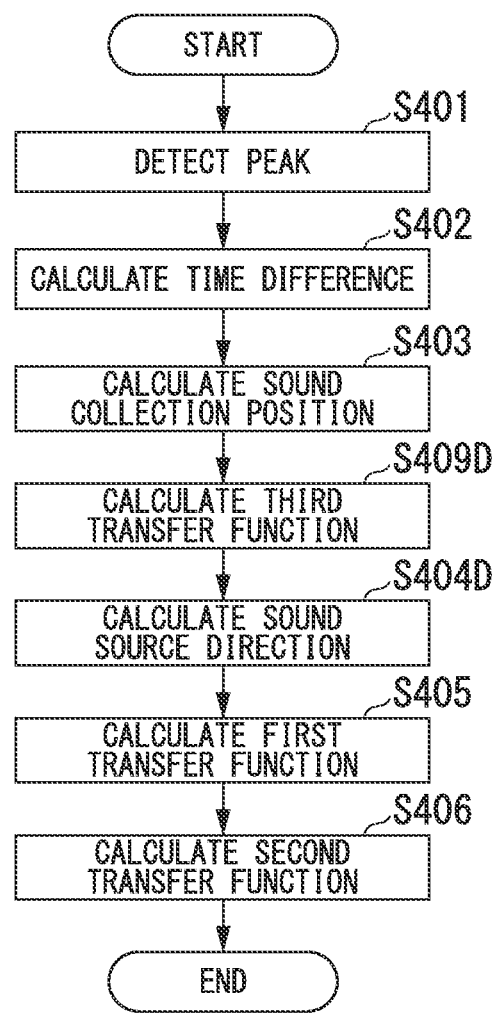
FIG. 19 is a flowchart illustrating sound processing according to the fifth embodiment of the present invention.

FIG. 19 is a flowchart illustrating the sound processing according to this embodiment.

The sound processing illustrated in FIG. 19 includes steps S401 to S403, S409D, S404D, S405, and S406.

The sound processing apparatus 10D performs step S409D after performing steps S401 to S403.

(Step S409D) The third transfer function calculating unit 1068D calculates the third transfer function $A_{[d][n]}(\omega)$ indicating the variation in phase due to the propagation to the sound collection positions of the channels indicated by the sound source state information input from the sound collection position calculating unit 105 for each sound source direction. Thereafter, the process flow moves to step S404D.

(Step S404D) The first sound source direction determining unit 1069D calculates the sound source direction d on the basis of the third transfer function information input from the third transfer function calculating unit 1068D and the sound signals of N+1 channels input from the peak detecting unit 103. Thereafter, the sound processing apparatus 10D performs steps S405 and S406.

As described above, in the sound processing apparatus 10D according to this embodiment, the sound source direction calculating unit 106D includes the third transfer function calculating unit 1068D that calculates the third transfer function indicating the variation in phase due to the propagation to the sound collection position calculated by the sound collection position calculating unit 105 for each sound source direction and the first sound source direction determining unit 1069D that determines the sound source direction on the basis of the third transfer function calculated by the third transfer function calculating unit 1068D and the sound signals of multiple channels.

According to this configuration, it is possible to calculate the third transfer function with a simple process and to determine the sound source direction on the basis of the variation in phase for each sound source direction at each sound collection position indicated by the calculated third transfer function. Accordingly, it is possible to reduce the computational load without reducing the estimation accuracy of the sound source direction.

Sixth Embodiment

A sixth embodiment of the present invention will be described below with reference to the accompanying drawings. The same elements as in the aforementioned embodiment will be referenced by the same reference numerals and a description thereof will not be repeated.

Figure 20:
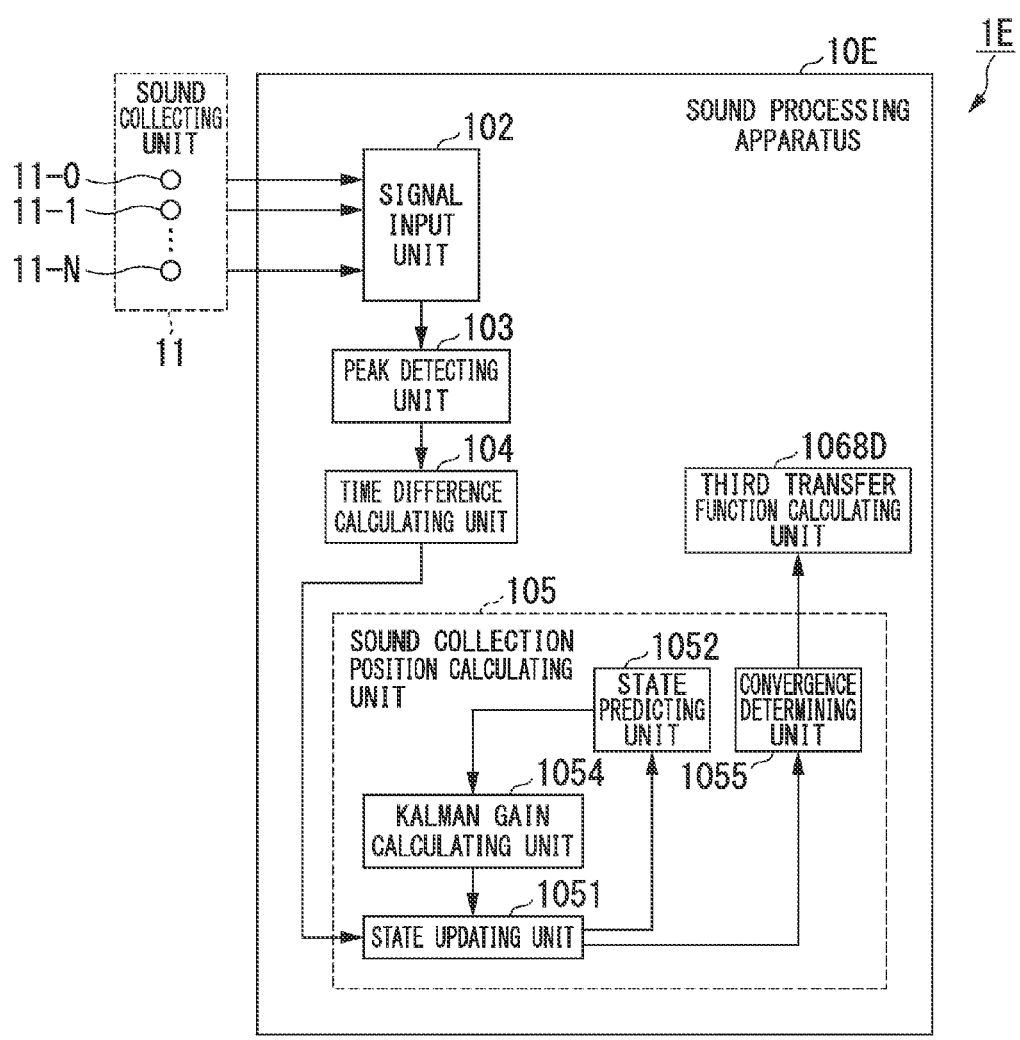
FIG. 20 is a block diagram schematically illustrating a configuration of a sound processing system according to a sixth embodiment of the present invention.

FIG. 20 is a block diagram schematically illustrating a configuration of a sound processing system 1E according to this embodiment.

The sound processing system 1E includes a sound collecting unit 11 and a sound processing apparatus 10E.

The sound processing apparatus 10E includes a signal input unit 102, a peak detecting unit 103, a time difference calculating unit 104, a sound collection position calculating unit 105, and a third transfer function calculating unit 1068D.

Figure 21:
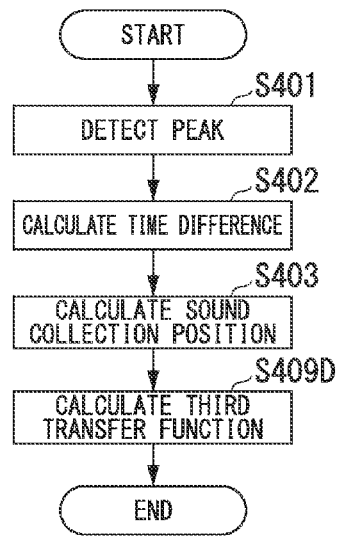
FIG. 21 is a flowchart illustrating sound processing according to the sixth embodiment of the present invention.

The sound processing apparatus 10E performs the sound processing illustrated in FIG. 21 with this configuration.

FIG. 21 is a flowchart illustrating the sound processing according to this embodiment.

The sound processing illustrated in FIG. 21 includes steps S401 to S403 and step S409D. The sound processing apparatus 10E performs step S409D after performing steps S401 to S403 and then ends the process flow illustrated in FIG. 21.

As described above, the sound processing apparatus 10E according to this embodiment calculates the sound collection positions of multiple channels on the basis of the sound signals of multiple channels. In the sound processing apparatus 10E, the third transfer function calculating unit 1068D calculates at least the third transfer function indicating a variation in phase in each sound source direction due to the propagation to the respective sound collection positions indicated by the sound source state information calculated by the sound collection position calculating unit 105.

According to this configuration, the sound collection positions can be sequentially estimated and the third transfer function in each sound source direction due to the propagation to the respective sound collection positions can be calculated with simple processes.

MODIFICATION EXAMPLES

While the embodiments of the present invention have been described above, the specific configuration thereof is not limited to the aforementioned configurations and can be modified in various design forms without departing from the gist of the present invention.

For example, similarly to the sound processing apparatus 10A (FIG. 11), the time difference information of the sound signals at a timing delayed by at least a predetermined delay time $T_A$ from the sound signal associated with the time difference information input to the sound collection position calculating unit 105 may be input to the sound source direction calculating unit 106B (FIG. 13) or the sound source direction calculating unit 106D (FIG. 18) and the first transfer function calculating unit 107 (FIGS. 13 and 18). The time difference information of the sound signals at a timing delayed by at least a predetermined delay time $T_A$ from the sound signal associated with the time difference information input to the sound collection position calculating unit 105C (FIG. 16) may be input to the sound source direction calculating unit 106B and the first transfer function calculating unit 107 (FIG. 16) of the sound processing apparatus 10C (FIG. 16).

The sound processing apparatuses 10B (FIG. 13) and 10C (FIG. 16) may include the sound source direction calculating unit 106D (FIG. 18) instead of the sound source direction calculating unit 106B.

In the sound processing apparatuses 10B (FIG. 13) and 10C (FIG. 16), the sound collection position calculating units 105 and 105C may include the reliability determining unit 1066B, and instead the reliability determining unit 1066B may be removed from the sound source direction calculating unit 106B (FIGS. 13 and 16). The reliability determining units 1066B included in the sound collection position calculating units 105 and 105C determine the absolute value $|\zeta_k - \zeta_{k|k-1}|$ of the predictive residual input from the state updating unit 1051 or the absolute value $|K_k(\zeta_k - \zeta_{k|k-1})|$ of the amount of sound source state information $\xi_k$ updated to be the reliability w.

The reliability determining unit 1066B outputs the reliability information indicating the reliability w to the first transfer function calculating unit 107 in correlation when the reliability w is less than the predetermined reliability threshold value $w_{th}$. When the reliability determining unit 1066B outputs the reliability information, the sound source direction calculating unit 106B (the sound source direction calculating unit 106D when the sound source direction calculating unit 106D is provided instead) may output the sound source direction information to the first transfer function calculating unit 107 and may correlate the sound source direction information with the reliability information.

The sound source direction calculating units 106B of the sound processing apparatuses 10B (FIG. 13) and 10C (FIG. 16) may calculate the sound source state information $\varepsilon_{k|k-1}$ and the sound source state information 4 so as to reduce the estimation error of the observed value $\zeta'_{k|k-1}$ using the second sound source direction d' calculated by the second sound source direction calculating unit 110C as the observed value $\zeta'_k$, similarly to the sound collection position calculating unit 105C (FIG. 16).

The sound processing apparatus 10D (FIG. 18) may include the sound collection position calculating unit 105C (FIG. 16) instead of the sound collection position calculating unit 105 and may further include the second sound source direction calculating unit 110C (FIG. 16). In this case, the second sound source direction calculating unit 110C calculates the second sound source direction d' using the second transfer function calculated by the second transfer function calculating unit 109 and outputs the calculated second sound source direction to the sound collection position calculating unit 105C.

The sound collection position calculating units 105 (FIGS. 1, 11, 13, 18, and 20) and 105C (FIG. 16), the sound source direction calculating units 106 (FIG. 1), 106A (FIG. 11), and 106B (FIGS. 13 and 16) may use a minimum mean squared error (MMSE) method, other coefficient calculating methods, or a system identifying method instead of the extended Kalman filter method to calculate the sound source state information $\xi_{k|k-1}$ and $\xi_k$ so as to reduce the estimation error of the observed value vector $\zeta_{k|k-1}$ or the observed value $\zeta'_{k|k-1}$.

The second sound source direction calculating unit 110C (FIG. 16) and the sound source direction calculating units 106D (FIG. 18) may use a generalized eigenvalue (GEVD)-MUSIC method, a generalized singular value decomposition (GSVD)-MUSIC method, a weighted delay and sum beam forming (WDS-BF) method, and other sound source direction calculating methods instead of the MUSIC method.

The second transfer function calculating units 109 (FIGS. 1, 11, 18, and 20) 109B (FIGS. 13 and 16) may calculate the second transfer function corresponding to the target sound source direction indicated by transfer function request information when the transfer function request information for requesting to calculate the transfer function is input from another apparatus (for example, robot) or other configurations (for example, input and output interface). In this case, the second transfer functions calculated by the second transfer function calculating units 109 and 109B may be output to the apparatus or configuration as an output source of the transfer function request information.

The second transfer function calculating units 109 and 109B may calculate the second transfer function corresponding to the target sound source direction by interpolating the first transfer functions corresponding to three or more reference sound source directions.

It has been described above that the second transfer function calculating units 109 and 109B construct the second transfer function $A_{[d][n]}(\omega)$ from the amplitude $\lambda_{m[T]}$ based on the TDLI method and the phase $t_{m[T]}$ based on the FDLI method at the time of interpolating the first transfer functions, but the present invention is not limited to this configuration. The second transfer function calculating units 109 and 109B may construct the second transfer function $A_{[d][n]}(\omega)$ from the amplitude $\lambda_{m[M]}$ based on a multiplication-based eigenvalue scaling interpolation (M-EVSI) method and the phase $t_{m[T]}$ based on the FDLI method. The second transfer function calculating units 109 and 109B may use other interpolation methods to interpolate the first transfer functions.

In the aforementioned example, the N+1 sound collecting units 11-0 to 11-N are arranged and fixed to the robot Ro, but may be installed in a moving object other than the robot, for example, a vehicle or a cart. The N+1 sound collecting units 11-0 to 11-N may be mounted on a human body. Each of the N+1 sound collecting unit s11-0 to 11-N may be detachably attached to different objects or may be individually movable.

The arrangement of all or a part of the N+1 sound collecting units 11-0 to 11-N is not particularly limited as long as they can collect sound arriving from a common sound source. All or a part of the N+1 sound collecting units 11-0 to 11-N may be arranged in a line or may be arranged on a plane or on a curved surface.

All of the N+1 sound collecting units 11-0 to 11-N may not be arranged within a predetermined range and at least a part thereof may be arranged outside the range.

Figure 22:
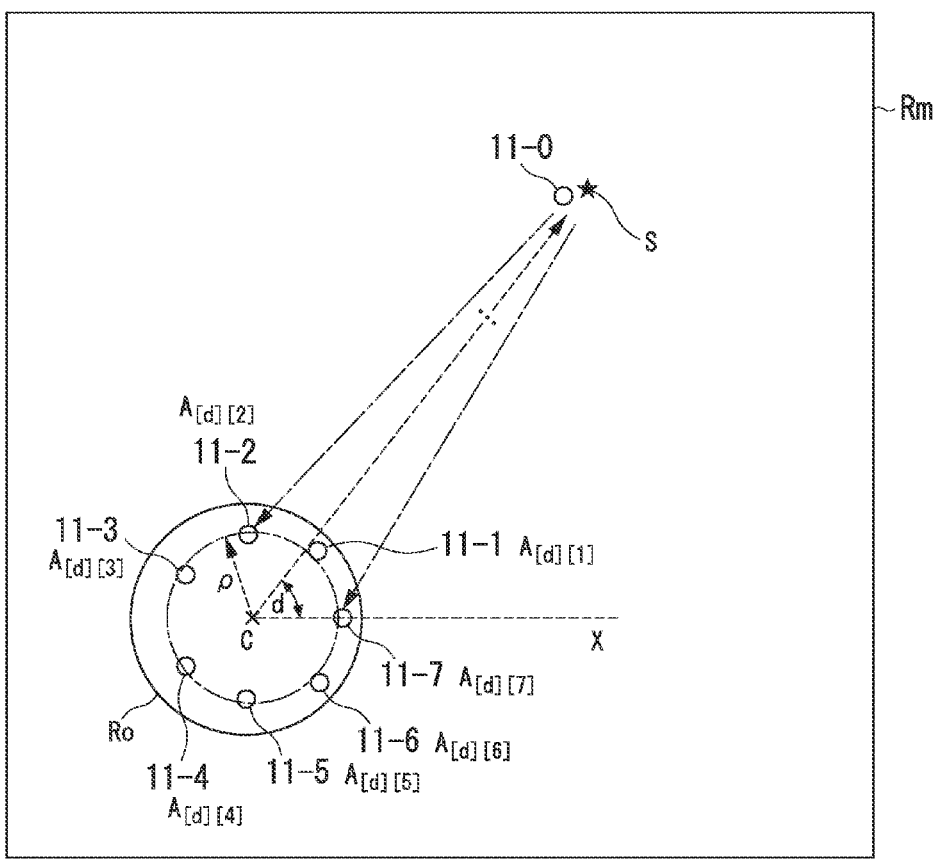
FIG. 22 is a plan view illustrating another arrangement example of a sound source and sound collecting units.

For example, as illustrated in FIG. 22, the sound collecting unit 11-0 of the representative channel may be arranged close to a sound source within a predetermined distance (for example, 5 cm) from the sound source.

FIG. 22 is a plan view illustrating another arrangement example of the sound source S and the sound collecting units 11-n.

As illustrated in FIG. 22, the sound collecting unit 11-0 may be arranged in the vicinity of the sound source S and the other seven sound collecting units 11-1 to 11-7 may be arranged at equal intervals on the circumference with a radius p from the head center C of the robot Ro. In this way, by arranging the sound collecting unit 11-0 closer to the sound source S than the other sound collecting units 11-1 to 11-7, the first transfer function calculating unit 107 can calculate the transfer functions from the sound S to the sound collecting unit 11-1 to 11-7 as the first transfer functions which are the transfer functions $A_{[d][1]}$ to $A_{[d][7]}$ of target channels 1 to 7. In addition, the second transfer function calculating units 109 and 109B can calculate the transfer functions in the target sound source direction from the sound source S to the sound collecting units 11-1 to 11-7 as the second transfer functions on the basis of the calculated first transfer functions.

It has been described above that the sound processing apparatuses 10 to 10E according to the aforementioned embodiment and modification examples calculate the sound source direction as the spatial information such as the position or the direction of a sound source and ignore the distance from the sound source to the sound collecting unit, but the present invention is not limited to this configuration. The sound processing apparatuses 10 to 10E may calculate the first transfer functions and the second transfer functions associated with the sound source position in a two-dimensional plane in consideration of the distance from the sound collecting unit to the sound source. The sound processing apparatuses 10 to 10E may calculate the first transfer functions and the second transfer functions associated with the sound source position in a three-dimensional space in consideration of the height or the elevation angle of the sound source from a predetermined plane.

A part of the sound processing apparatuses 10 to 10E according to the aforementioned embodiments and the modification examples, for example, the peak detecting unit 103, the time difference calculating unit 104, the sound collection position calculating unit 105 and 105C, the sound source direction calculating units 106, 106A, 106B, and 106D, the third transfer function calculating unit 1068D, the first transfer function calculating units 107 and 107A, the second transfer function calculating units 109 and 109B, and the second sound source direction calculating unit 110C may be realized by a computer. In this case, the part of the processing units may be realized by recording a program for performing the control functions on a computer-readable recording medium and causing a computer system to read and execute the program recorded on the recording medium. Here, the "computer system" is a computer system incorporated in the sound processing apparatuses 10 to 10E and may include an OS or hardware such as peripherals. Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that dynamically holds a program for a short time, like a communication line in a case where the program is transmitted via a network such as the Internet or a communication circuit such as a telephone circuit and a medium that temporarily holds the program for a predetermined time like a volatile memory in a computer system serving as a server or a client in that case. The program may be configured to realize a part of the above-mentioned functions or may be configured to realize the above-mentioned functions by combination with a program recorded in advance in a computer system.

All or a part of the sound processing apparatuses 10 to 10E according to the aforementioned embodiments and the aforementioned modification examples may be embodied by an integrated circuit such as a large scale integration (LSI) circuit. The functional blocks of the sound processing apparatuses 10 to 10E may be individually incorporated into processors, or a part or all thereof may be integrated and incorporated into a processor. The integration circuit technique is not limited to the LSI, but may be embodied by a dedicated circuit or a general-purpose processor. When an integration circuit technique appears as a substituent of the LSI with advancement in semiconductor technology, an integrated circuit based on the technique may be used.

While the embodiments of the present invention have been described above in detail with reference to the accompanying drawings, the specific configuration thereof is not limited to the aforementioned embodiments and various modifications in design may be made therein without departing from the gist of the present invention.

What is claimed is:

1. A sound processing apparatus comprising:
   a sound collection position calculating unit configured to calculate sound collection positions of sound signals of multiple channels on the basis of the sound signals;
   a sound source direction calculating unit configured to calculate sound source directions respectively corresponding to the multiple channels on the basis of the sound signals of the multiple channels;
   a first transfer function calculating unit configured to calculate first transfer functions respectively corresponding to the sound source directions on the basis of the sound signals of the multiple channels; and
   a second transfer function calculating unit configured to calculate a second transfer function by interpolating the first transfer functions between the sound source directions.

2. The sound processing apparatus according to claim 1, further comprising a time difference calculating unit configured to calculate an inter-channel time difference of the sound signals,
   wherein the sound collection position calculating unit includes
       a first state predicting unit configured to predict current sound source state information from previous sound source state information as sound source state information including the sound collection position, and
       a first state updating unit configured to update the current sound source state information so as to reduce a difference between the time difference calculated by the time difference calculating unit and a time difference based on the current sound source state information.

3. The sound processing apparatus according to claim 2, wherein the time difference calculating unit calculates the inter-channel time difference of the sound signals in which the sound collection positions are located within a predetermined range.

4. The sound processing apparatus according to claim 2, wherein time difference information at a timing which is delayed by at least a predetermined delay time from the time difference information input to the sound collection position calculating unit is input to the sound source direction calculating unit, and
   wherein time difference information at a timing which is delayed by at least the predetermined delay time from the sound signal associated with the time difference information input to the sound collection position calculating unit is input to the first transfer function calculating unit.

5. The sound processing apparatus according to claim 2, wherein the sound source direction calculating unit includes
   a second state predicting unit configured to predict current sound source state information from previous sound source state information as sound source state information including the sound source position, and
   a second state updating unit configured to update the current sound source state information so as to reduce a difference between the time difference calculated by the time difference calculating unit and a time difference based on the current sound source state information.

6. The sound processing apparatus according to claim 5, wherein the second transfer function calculating unit interpolates the first transfer function calculated by the first transfer function calculating unit by weighting based on an amount of sound source state information updated by the second state updating unit.

7. The sound processing apparatus according to claim 5, further comprising a second sound source direction calculating unit configured to calculate a sound source direction on the basis of the second transfer function calculated by the second transfer function calculating unit and the sound signals of multiple channels,
   wherein the second state updating unit updates the current sound source state information so as to reduce a difference between the sound source direction calculated by the second sound source direction calculating unit and a sound source direction based on the current sound source state information.

8. The sound processing apparatus according to claim 1, wherein the sound source direction calculating unit includes
   a third transfer function calculating unit configured to calculate a third transfer function indicating a phase variation due to propagation of sound to the sound collection position calculated by the sound collection position calculating unit for each sound source direction, and
   a first sound source direction determining unit configured to determine the sound source direction on the basis of the third transfer function calculated by the third transfer function calculating unit and the sound signals of multiple channels.

9. A sound processing method in a sound processing apparatus, comprising:
   a step of calculating sound collection positions of sound signals of multiple channels on the basis of the sound signals;
   a step of calculating sound source directions respectively corresponding to the multiple channels on the basis of the sound signals of the multiple channels;
   a step of calculating first transfer functions respectively corresponding to the sound source directions on the basis of the sound signals of the multiple channels; and
   a step of calculating a second transfer function by interpolating the first transfer functions between the sound source directions.

10. The sound processing apparatus according to claim 1, wherein the second transfer function is configured to calculate the second transfer function corresponding to a target sound source direction by
    specifying neighboring sound source directions among the sound source directions interposing the target sound source direction therebetween, as a first reference sound source and a second reference sound source, and interpolating the first transfer function corresponding to the first reference sound source and the first transfer function corresponding to the second reference sound source.

* * * * *